United States Patent
Yanahara et al.

(10) Patent No.: US 12,285,893 B2
(45) Date of Patent: Apr. 29, 2025

(54) INJECTION MOLDING SYSTEM WITH CONVEYOR DEVICES TO INSERT OR EJECT MOLDS

(71) Applicants: Canon Virginia, Inc., Newport News, VA (US); CANON U.S.A., INC., Melville, NY (US)

(72) Inventors: Yuichi Yanahara, Moriyama (JP); Koki Kodaira, Tokyo (JP); Hideo Matsumoto, Kusatsu (JP); Nobunari Shimoe, Kusatsu (JP); Hiroyuki Katagiri, Kusatsu (JP); Tomoaki Ikeguchi, Kusatsu (JP); Junko Tajima, Amsterdam (NL); Kenta Inaba, Kawasaki (JP)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 90 days.

(21) Appl. No.: 17/602,253

(22) PCT Filed: Apr. 7, 2020

(86) PCT No.: PCT/US2020/027102
§ 371 (c)(1),
(2) Date: Oct. 7, 2021

(87) PCT Pub. No.: WO2020/210256
PCT Pub. Date: Oct. 15, 2020

(65) Prior Publication Data
US 2022/0193962 A1   Jun. 23, 2022

Related U.S. Application Data

(60) Provisional application No. 62/832,732, filed on Apr. 11, 2019.

(51) Int. Cl.
*B29C 45/04* (2006.01)
*B29C 45/10* (2006.01)
*B29C 45/66* (2006.01)

(52) U.S. Cl.
CPC .......... *B29C 45/0408* (2013.01); *B29C 45/10* (2013.01); *B29C 45/66* (2013.01)

(58) Field of Classification Search
CPC ........ B29C 2045/2604; B29C 45/0408; B29C 31/006; B29C 45/0433; B29C 45/10;
(Continued)

(56) References Cited

U.S. PATENT DOCUMENTS 4,174,939 A * 11/1979 Fenner ................. B29C 45/2602
 249/68
4,403,810 A * 9/1983 Bieneck .................... H03F 3/24
 425/DIG. 221

(Continued)

FOREIGN PATENT DOCUMENTS

JP   S56120324 A   9/1981
JP   S58-066926 U   5/1983
(Continued)

OTHER PUBLICATIONS

Lampl (English Translation of AT399843B) (Year: 1994).*
(Continued)

*Primary Examiner* — Michael A Tolin
*Assistant Examiner* — Hana C Page
(74) *Attorney, Agent, or Firm* — Canon U.S.A., Inc., IP Division

(57) ABSTRACT

A method for detachably attaching a linking unit, including an end with a hole and a slit, to a mold, the method comprising inserting a first attachment member connected to the mold through the hole; and inserting a second attachment member connected to the mold through the slit, wherein the
(Continued)

linking unit is detached from the mold by moving the linking unit in a direction opposite to a direction in which the slit is formed in a state where the first attachment member is disconnected from the mold and the second attachment member remains connected to the mold.

5 Claims, 22 Drawing Sheets

(58) Field of Classification Search
CPC .............. B29C 45/1756; B29C 45/641; B29C 45/1742; B29C 45/332
See application file for complete search history.

(56) References Cited

U.S. PATENT DOCUMENTS

| | | | |
|---|---|---|---|
| 5,580,587 A * | 12/1996 | Leonhartsberger | ........................... B29C 45/1756 425/185 |
| 11,104,050 B2 | 8/2021 | Nakamura | |
| 2012/0093955 A1 | 4/2012 | Mironov | |
| 2017/0291339 A1 | 10/2017 | Kawamura et al. | |
| 2018/0009146 A1* | 1/2018 | Nakamura | .............. B29C 45/80 |
| 2019/0152102 A1* | 5/2019 | Kitaura | ............... B29C 45/1756 |
| 2019/0224893 A1* | 7/2019 | Oono | ..................... B29C 45/40 |

FOREIGN PATENT DOCUMENTS

| | | |
|---|---|---|
| JP | S61-184708 U | 11/1986 |
| JP | S62111822 U | 7/1987 |
| JP | S6397351 A | 4/1988 |
| JP | H06035072 U | 5/1994 |
| JP | 2002192563 A | 7/2002 |
| JP | 2008173911 A | 7/2008 |
| JP | 6121601 B1 | 4/2017 |
| JP | 2019126906 A | 8/2019 |
| JP | 2020019231 A | 2/2020 |

OTHER PUBLICATIONS

"Bushings" (iglidur® Frequently Asked Questions, publicly available on Jan. 3, 2013). (Year: 2013).*

English Translation of JPH04115909 (Year: 1992).*

* cited by examiner

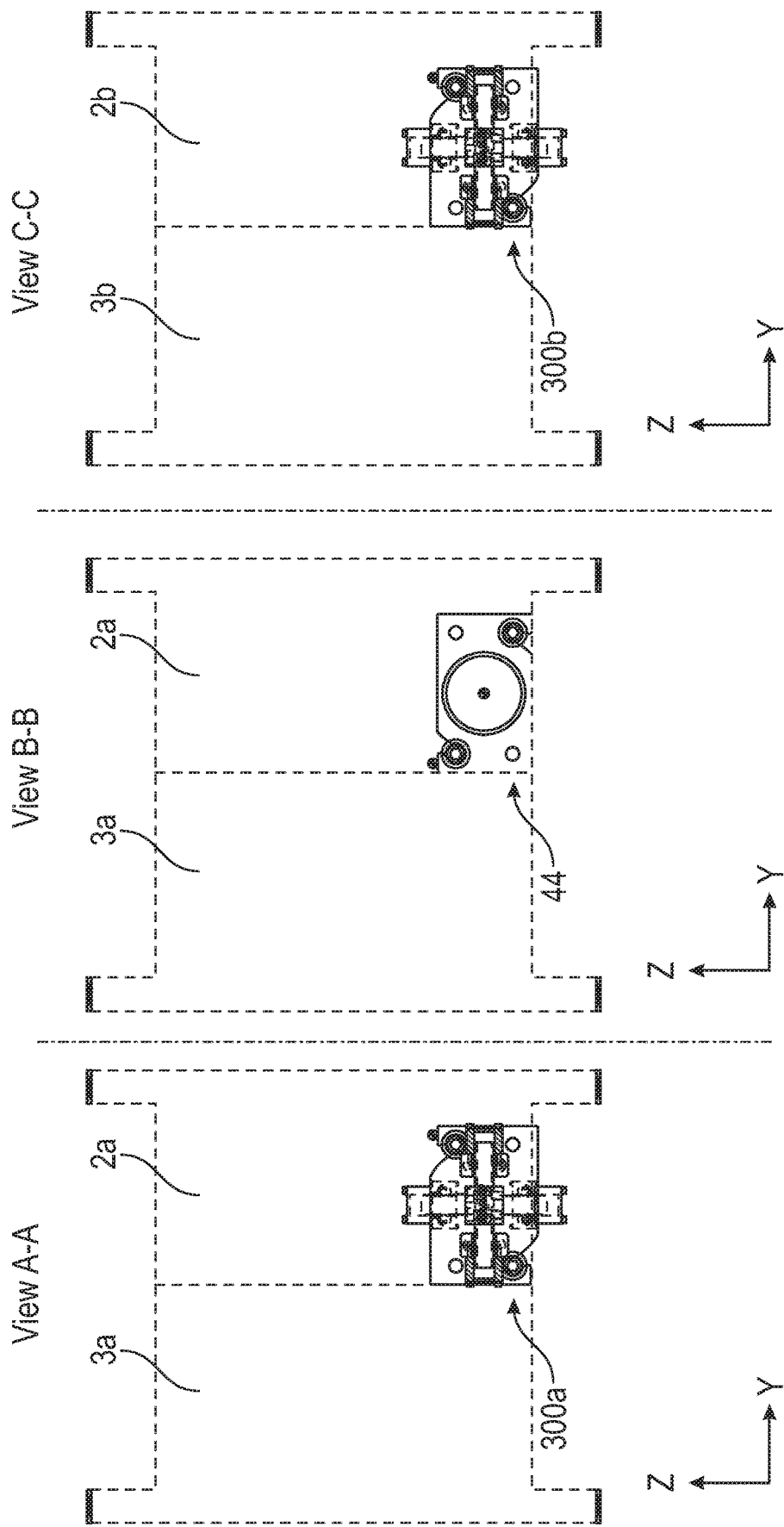

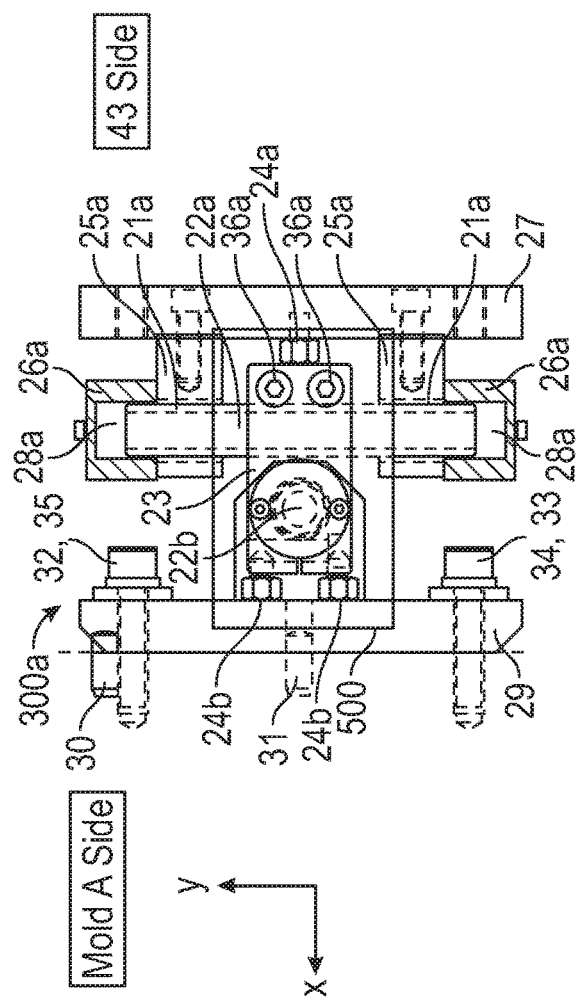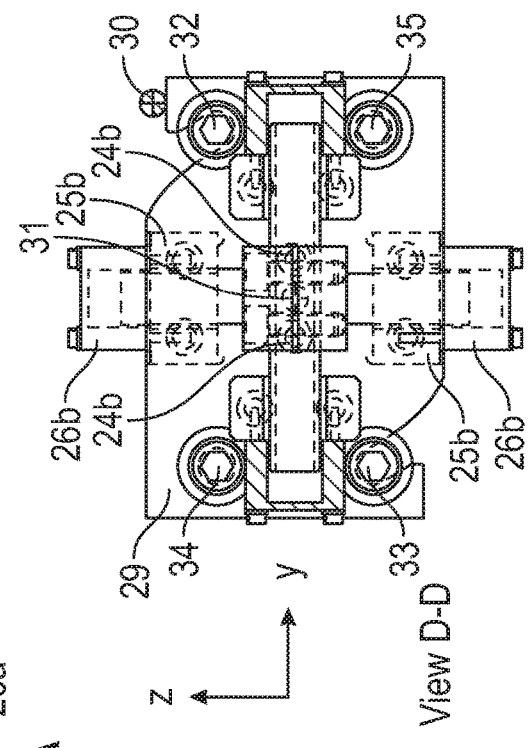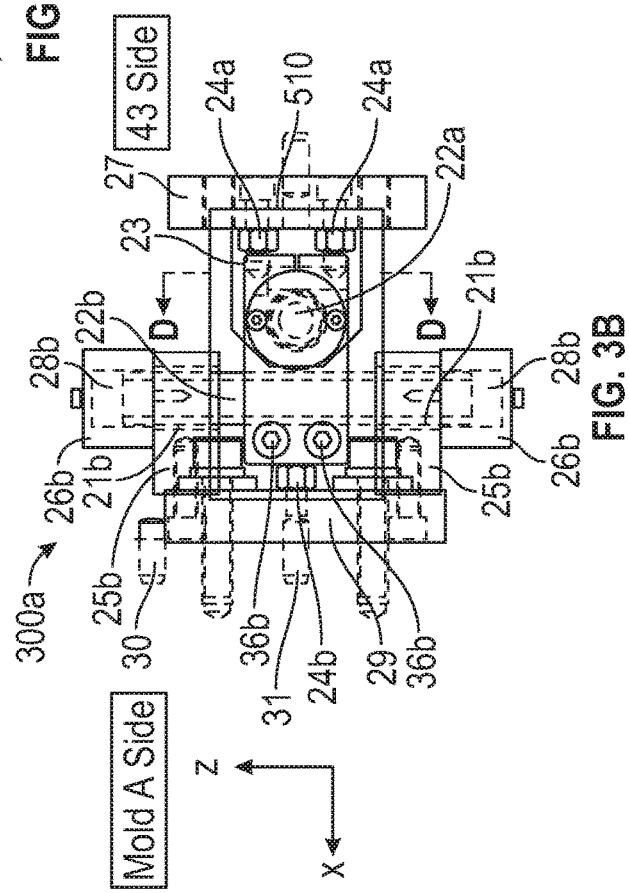

View D-D

View D-D

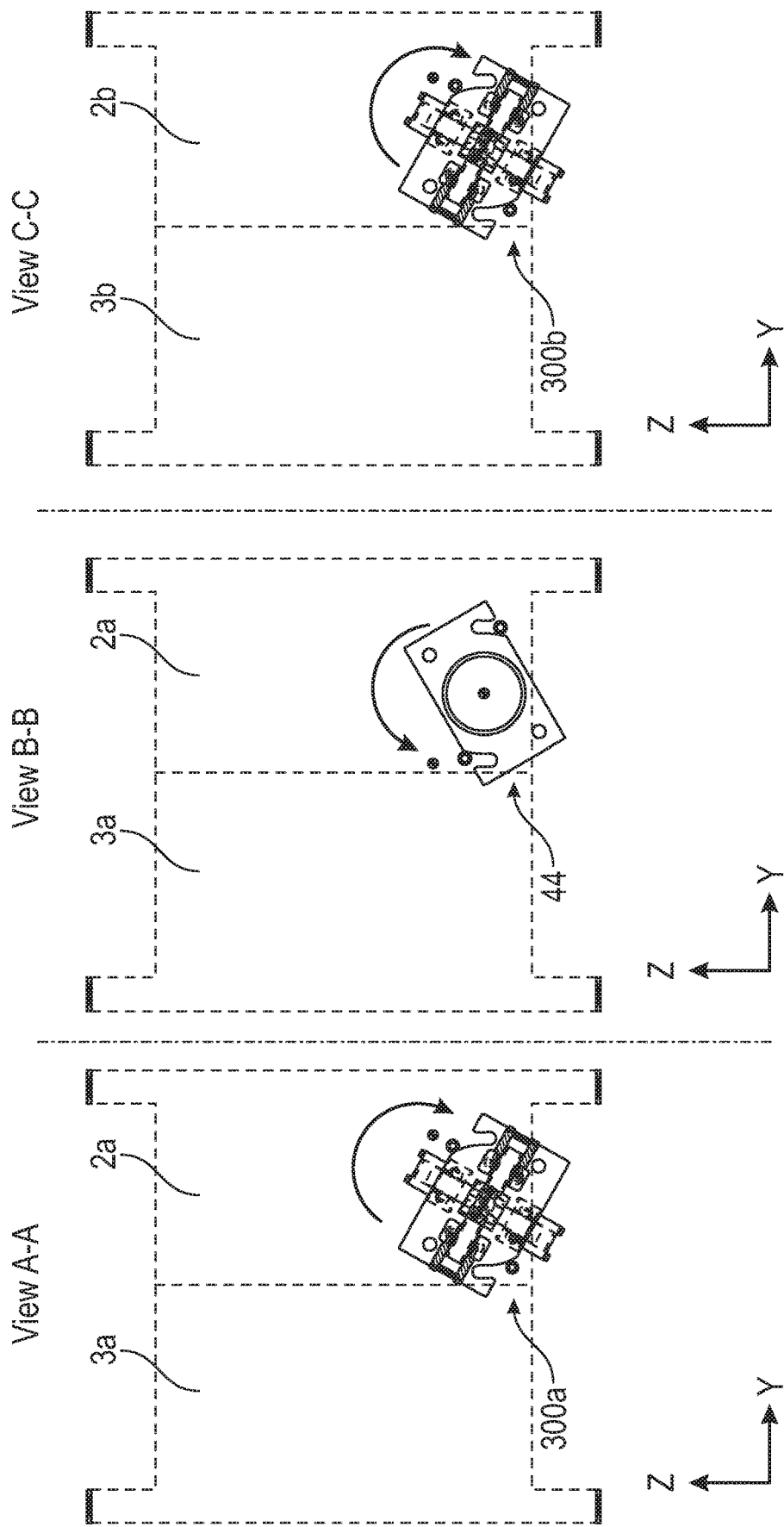

View D-D

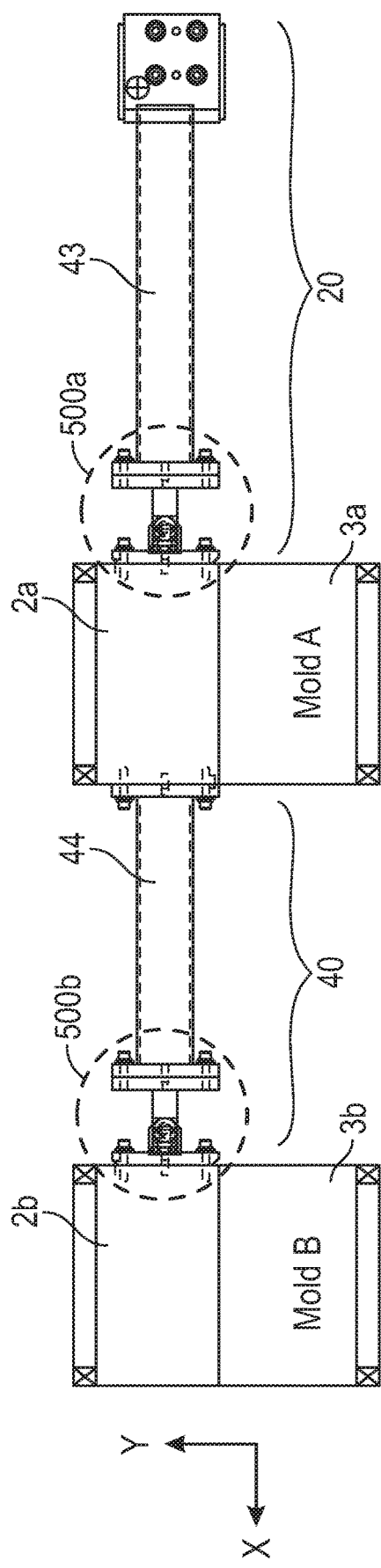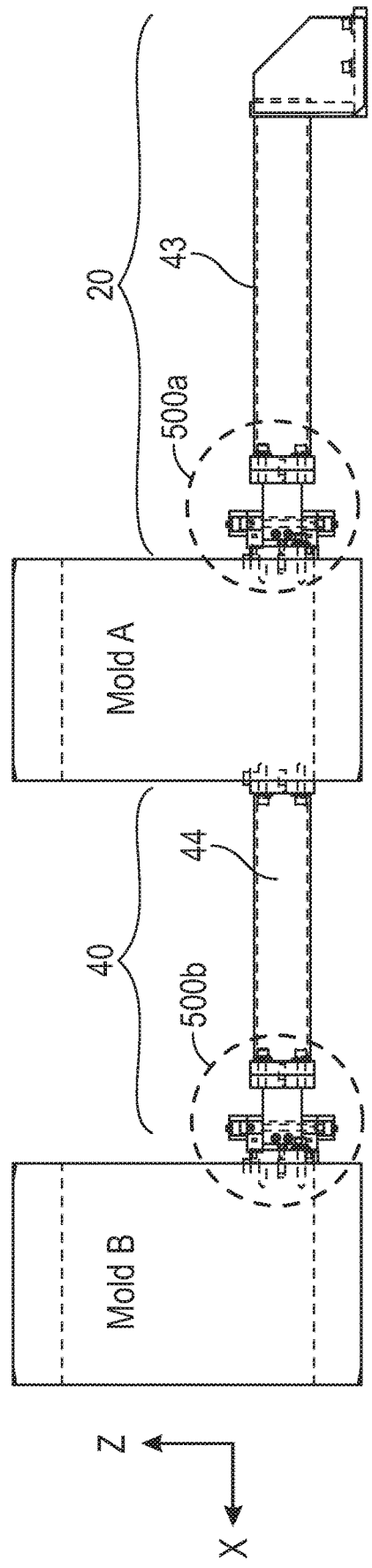
FIG. 17A
FIG. 17B

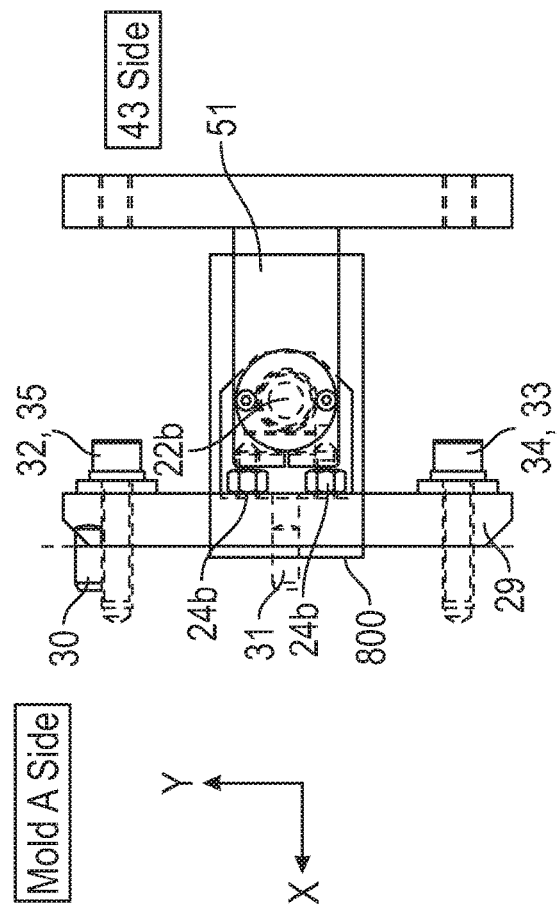
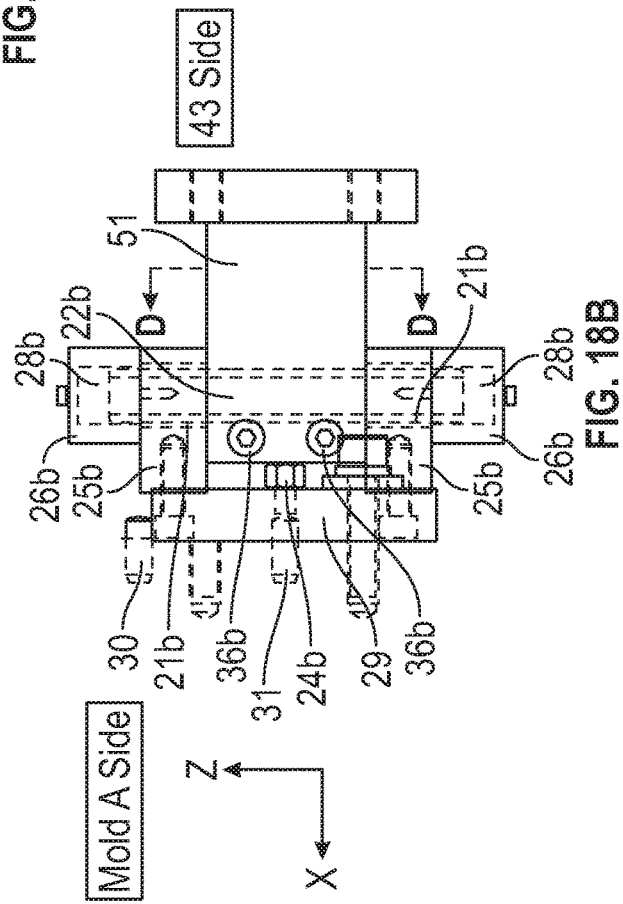

INJECTION MOLDING SYSTEM WITH CONVEYOR DEVICES TO INSERT OR EJECT MOLDS

CROSS-REFERENCE TO RELATED APPLICATIONS

This application claims priority to U.S. Application No. 62/832,732 which was filed on Apr. 11, 2019.

BACKGROUND

In general, the manufacturing process for an injection molding machine involves injection, cooling, and removing molded parts, where the injection molding machine typically does not move during the cooling, which can limit productivity. US 2018/0009146/Japanese patent publication No. 2018-001738/VN20160002505 is seen to discuss a manufacturing method for molded parts that includes switching back and forth between two molds on one injection molding machine. US 2018/0009146/Japanese patent publication No. 2018-001738/VN20160002505 is seen to discuss is also seen to disclose a configuration for moving two molds, where a first actuator moves a first mold to one side of the injection molding machine and a second actuator moves a second mold to the other side of the injection molding machine.

In the above-described configuration, a linking unit is installed between the first actuator and the first mold to transmit the power of the first actuator to the first mold. A similar linking unit is installed between the second actuator and the second mold.

In general, molds are manufactured from metals such as steel, and can reach a substantial weight. A large load will be applied to the linking unit if misalignment occurs between the mold and the actuator, or between the molds themselves when moving heavy molds. As a result, it is possible to damage the linking unit or negatively affect the actuator, such that actuator becomes a source of failure. A configuration that reduces the possibility of this type of linking unit damage or actuator failure is needed.

SUMMARY

A method for detachably attaching a linking unit, including an end with a hole and a slit, to a mold, the method comprising inserting a first attachment member connected to the mold through the hole; and inserting a second attachment member connected to the mold through the slit, wherein the linking unit is detached from the mold by moving the linking unit in a direction opposite to a direction in which the slit is formed in a state where the first attachment member is disconnected from the mold and the second attachment member remains connected to the mold.

A linking unit for connecting a plurality of molds, the linking unit including a first connection member for connecting to a first mold; and a second connection member for connecting to a second mold, wherein the first connection member includes a slit configured to receive an attachment member for connecting the linking unit and the first mold, and wherein the slit includes a shape such that the connection between the linking unit and the first mold established by the attachment member is released based on movement of the first connection member.

BRIEF DESCRIPTION OF THE DRAWINGS

The accompanying drawings, which are incorporated herein and form part of the specification, illustrate various embodiments, objects, features, and advantages of the present disclosure.

FIG. 2C illustrates the cross section A, illustrated in FIG. 2B, from the direction of arrow "A".

FIG. 2D illustrates the cross section B, illustrated in FIG. 2B, from the direction of arrow "B".

FIG. 2E illustrates the cross section C, illustrated in FIG. 2B, from the direction of arrow "C".

FIG. 3A illustrates a top view of the floating joint 300a.

FIG. 3B illustrates a side view of the floating joint 300a.

FIG. 3C illustrates the cross section D, illustrated in FIG. 3B, from the direction of the arrow.

FIG. 9A illustrates removal of the floating joint 300a from the mold A

FIG. 9B illustrates removal of the linking bracket 44 from the mold A

FIG. 9C illustrates removal of the floating joint 300b from the mold B

FIG. 17A illustrates a top view of the linking unit 20, the linking unit 40 and the molds A and B.

FIG. 17B illustrates a side view of the linking unit 20, the linking unit 40, and the molds A and B.

FIG. 18A illustrates a top view of the floating joint 500a.

FIG. 18B illustrates a side view of the floating joint 500.

FIG. 18C illustrates the figure of the cross section D, illustrated in FIG. 18B, viewed from the direction of the arrow.

Figure 1A:
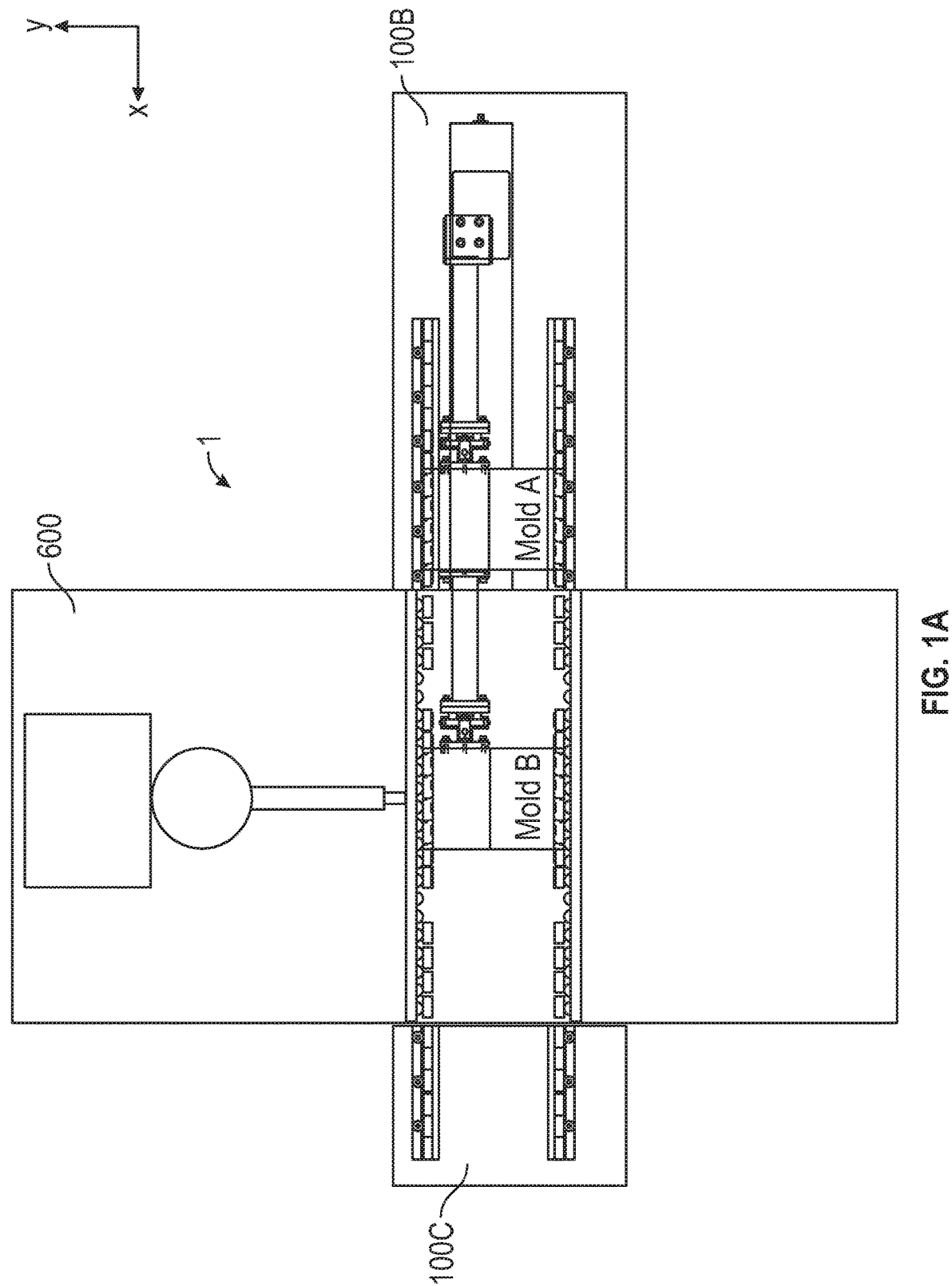
FIG. 1A and FIG. 1B illustrate an external view of the injection molding system 1.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF THE EXEMPLARY EMBODIMENTS

The present disclosure describes several exemplary embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, an injection molding system according to an exemplary embodiment of the present disclosure will be described. The arrow symbols X and Y in each figure indicate horizontal directions that are orthogonal to each other, while the arrow symbol Z indicates a vertical (upright) direction. The Z-axis direction is a direction perpendicular to the ground surface.

Figure 1B:
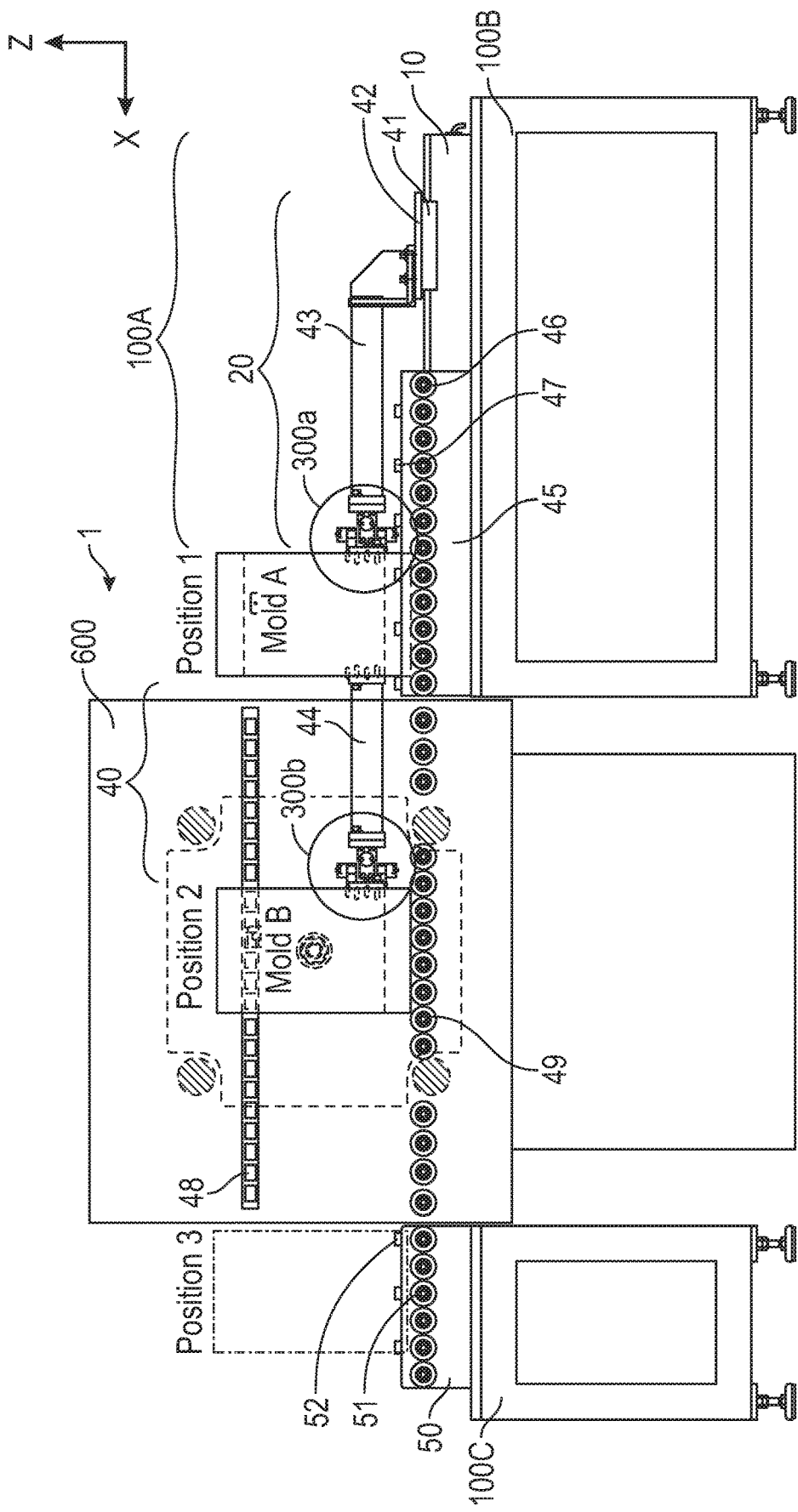

FIG. 1A and FIG. 1B illustrate an external view of the injection molding system 1 of the exemplary embodiment. Resin is primarily used as a material to inject into a mold. However, the present embodiment is not limited to using resin, and any materials, such as wax or metal, that would enable practice of the present embodiment is applicable. FIG. 1A illustrates a top view of the injection molding system 1. FIG. B illustrates a side view of the injection molding system 1.

As illustrated in FIG. 1A, the injection molding system 1 includes the injection molding machine 600, conveyor device 100B, and conveyor device 100C, which move the mold A or the mold B into the injection molding machine 600. As illustrated in FIG. 1B, the drive unit 100A is mounted on the conveyor device 100B to move the mold A and the mold B, which are linked.

The block 45, to which the bottom guide roller 46 and the side guide roller 47 are connected, is located on the top panel of the conveyor device 100B and 100C. The bottom guide roller 46 contacts the bottom panel of the mold A, and guides the motion of the mold A. The side guide roller 47 contacts the side panel of the mold A, and guides the motion of the mold A. In addition, there is a bottom guide roller 49 and a side guide roller 48 installed inside the injection molding machine 600. The block 50, to which the bottom guide roller 51 and the side guide roller 52 are connected, is located on the conveyor device 100C.

The drive unit 100A alternately moves the mold A or the mold B to a specified injection position, illustrated in FIG. 1B as "Position 2". The specified injection position is a position inside the injection molding machine 600 where injection of resin into the mold takes place, as well as removing the molded part. "Position 1" in FIG. 1B is a standby position to cool down the mold A, while "Position 3" is a standby position to cool down the mold B. By moving either the mold A or the mold B to the "Position 2", and moving the other mold to the "Position 1" or "Position 3" respectively, resin can be injected into one mold while cooling down the other mold.

The details of the drive unit 100A are described with respect to FIG. 1B. The mold A and the mold B are linked to the drive unit 100A and can be moved by driving the actuator 10. The linking unit 20, includes the linking bracket 43 and the floating joint 300a, and links the actuator 10 and the mold A. The linking unit 40 includes the linking bracket 44 and the floating joint 300b, and links the mold A and the mold B.

The slider 41 of the actuator 10 is connected to the mold A via the plate 42, the linking bracket 43, and the floating joint 300a. This enables moving the mold A along the X axis direction by moving the slider 41 along the X axis direction. In addition, because the mold B is connected to the mold A via the linking bracket 44 and the floating joint 300b, the mold B also moves along the X axis direction by moving the mold A along the X axis direction. That is, as illustrated in FIG. 1B, when moving the mold A in the +X axis direction, the mold B also moves in the +X axis direction.

Figure 2A:
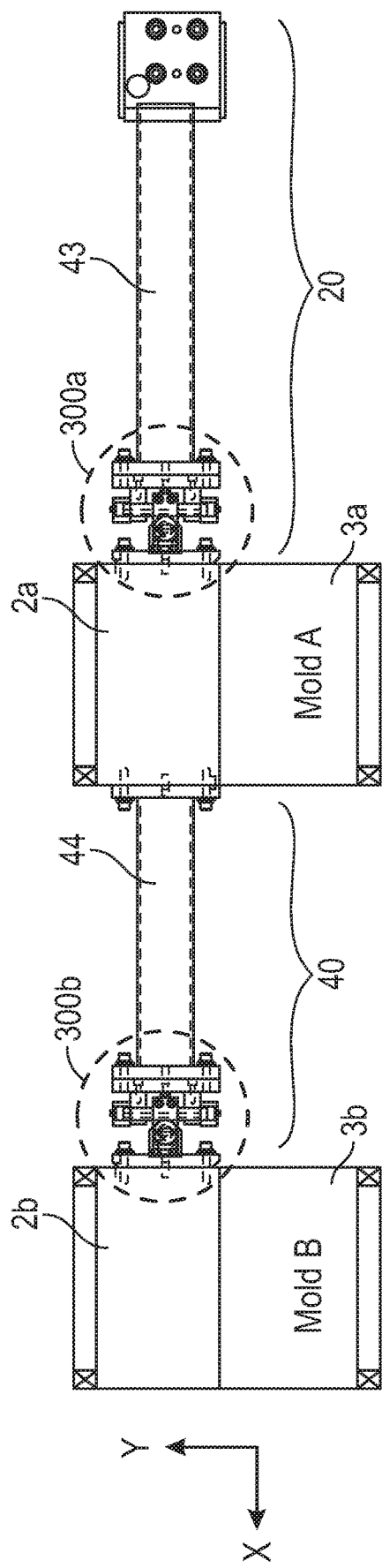
FIG. 2A illustrates a top view of the linking unit 20, the linking unit 40 and the molds A and B.
Figure 2B:
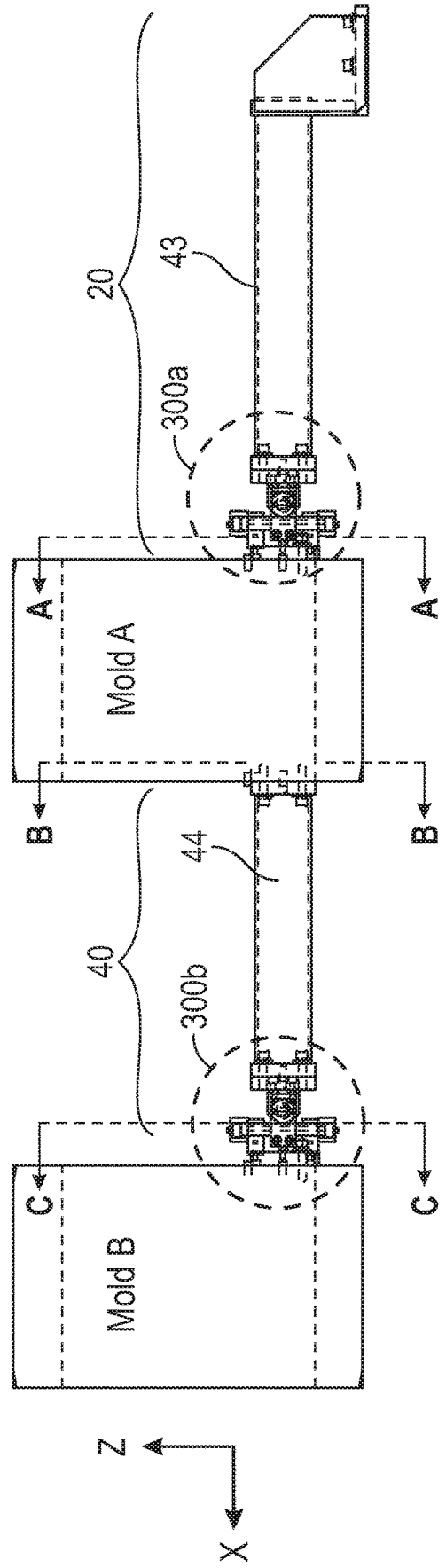
FIG. 2B illustrates a side view of the linking unit 20, the linking unit 40 and the molds A and B.

FIG. 2A illustrates a top view of the linking unit 20, the linking unit 40 and the molds A and B. FIG. 2B illustrates a side view of the linking unit 20, the linking unit 40 and the molds A and B. FIG. 2C illustrates the cross section A, illustrated in FIG. 2B, from the direction of arrow "A". FIG. 2D illustrates the cross section B, illustrated in FIG. 2B, from the direction of arrow "B". FIG. 2E illustrates the cross section C, illustrated in FIG. 2B, from the direction of arrow "C". In FIG. 2A-FIG. 2C, the floating joint 300a is fixed to a stationary mold 2a of the mold A, the linking bracket 44 is fixed to the stationary mold 2a of the mold A, and the floating joint 300b is fixed to a stationary mold 2b of the mold B. The stationary mold 2a/2b is a mold that does not move in the Y axis direction. Movable mold 3 is a mold that moves in the Y axis direction inside the injection molding machine 600 when removing a molded part.

The shapes of the molds and the rollers may not always perfectly match due to individual variations of the molds and/or rollers. In some instances molding is conducted using two molds differing in shape from each other. Since it can be difficult to align the positions of conveyor device 100B or conveyor device 100C with respect to the injection molding machine 600, it can also difficult to align the positions of the rollers included with various components.

Differences in shape can generate misalignment when moving the mold A or the mold B due to the differences in the roller positions or height of the rollers. A load occurring in the Y axis direction, the Z axis direction, the θY direction, and the θZ direction can be generated to the linking unit 20 or the linking unit 40. When performing a mold clamping motion with the injection molding machine 600, a large load can be generated in the θZ direction. The mold clamping motion is a motion of pushing the movable mold 3 against the stationary mold 2, and the motion of preparing to inject resin. In the present embodiment, the floating joints 300a and 300b are connected to the linking unit 20 and the linking unit 40 respectively in consideration of this type of load.

Next, the details of the floating joints 300a and 300b will be described. Because the configuration of the floating joint 300a and 300b are the same, the following description will just refer to the floating joint 300a, but is applicable to the floating joint 300b. FIG. 3A illustrates a top view of the floating joint 300a. FIG. 3B illustrates a side view of the floating joint 300a. FIG. 3C illustrates the cross section D, illustrated in FIG. 3B, from the direction of arrow "D".

As illustrated in FIG. 3A and FIG. 3B, the floating joint 300a is equipped with the pipe shaft 22b, which extends in the Z axis direction, and a pipe shaft 22a, which extends in the Y axis direction. The pipe shaft 22b is clamped in the Y axis direction by the two bolts 36b, and fixed against the block 23. The pipe shaft 22a is clamped in the Z axis direction by the two bolts 36a, and fixed against the block 23. The pipe shaft 22a and pipe shaft 22 can be hollow or non-hollow.

The plate 29 is fastened to the mold A, and the plate 27 is fastened to the linking bracket 43. As illustrated in FIG. 3C, the positioning pin 30 and the positioning pin 31 are located on the mold A. A precision hole for the positioning pin 31 is located in the center of the plate 29, and the mold A and the plate 29 are assemble such that the positioning pin 31 fits into the precision hole. The plate 29 is rotated in the counter clockwise direction as illustrated in FIG. 3C. The plate 29 is fastened to the mold A with the four bolts 32-35 in the location where the plate 29 contacts the positioning pin 30.

The pipe shaft 22b is secured on both ends by the two holders 25b, which include the oil-free bushings 21b, and can move by sliding along the Z axis direction. The pipe shaft 22a is secured on both ends by the two holders 25a, which include the oil-free bushings 21a, and can move by sliding along the Y axis direction. The two holders 25b are fixed on the plate 29, and the two holders 25a are fixed on the plate 27. Slidability of the pipe shaft 22b can be improved by assembling the lid 26b to the holder 25b to seal it, and grease 28b is applied to the inner surface of the lid 26b. The lid 26a is assembled to the holder 25a to seal it, and grease 28a is applied to the inner surface of the lid 26a.

Since the pipe shaft 22b is not fixed against the holder 25b, each part that is fixed on the plate 29 can rotate with the pipe shaft 22b as the axis. In other words, it is possible to rotate with the Z axis as the center. Since the pipe shaft 22a is not fixed against the holder 25a, each part that is fixed on the plate 27 can rotate with the pipe shaft 22a as the axis. In other words, it is possible to rotate with the Y axis as the center.

Figure 4A:
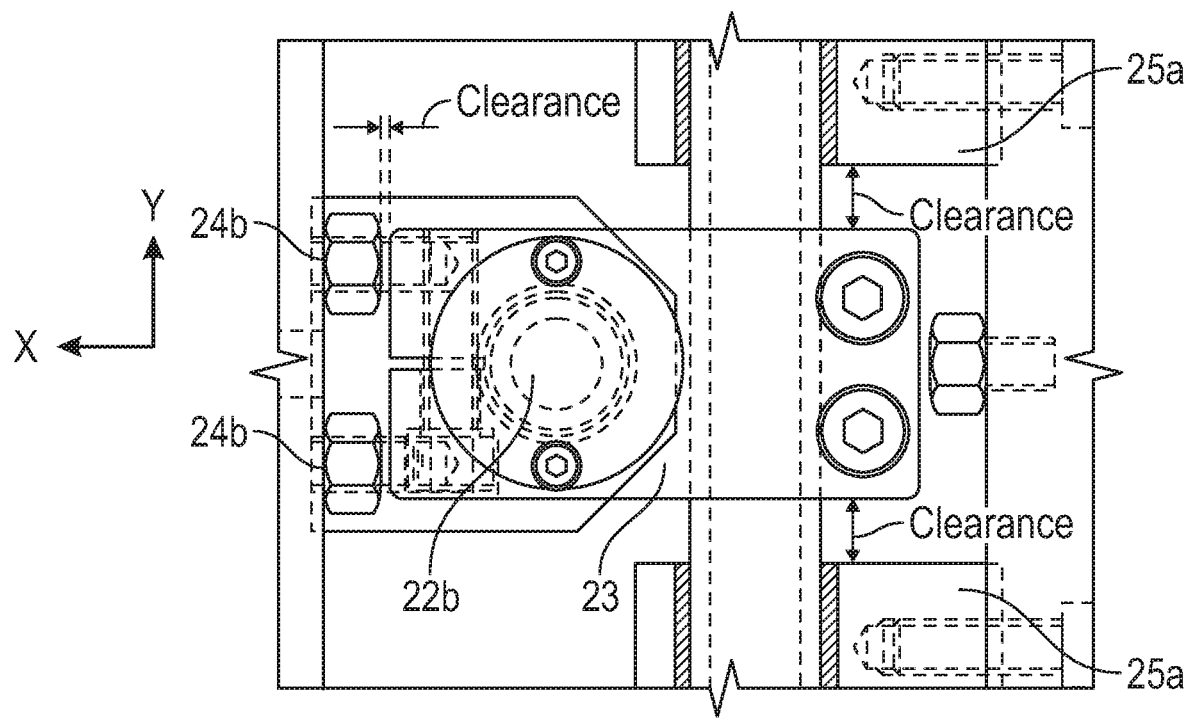
FIG. 4A illustrates an enlarged view of the area 500 of FIG. 3A.

FIG. 4A illustrates an enlarged view of the area 500 of FIG. 3A. There are two stop pins 24b located along the Y axis direction on the plate 29. There is a gap located between the stop pins 24b and the block 23. The rotation (θZ), that moves the pipe shaft 22b as the center occurs in the gap. The amount of rotation is controlled by the contact between the stop pins 24b and the block 23. The amount of parallel motion in the Y axis direction is controlled by the contact between the side panels of the block 23 and the holder 25a. Even if the block 23 moved parallel in the Y axis direction, the block 23 can contact the stop pins 24b if it is within the range of the amount of motion.

Figure 4B:
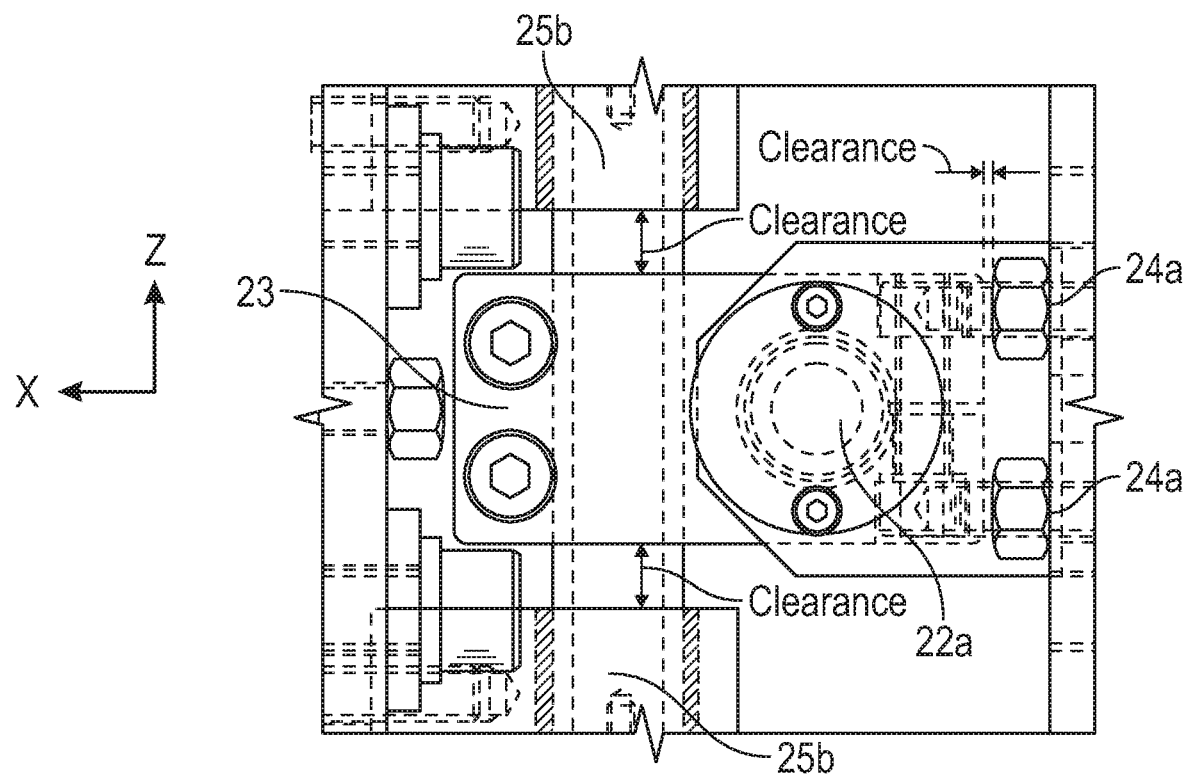
FIG. 4B illustrates an enlarged view of the area 510 of FIG. 3B.

FIG. 4B illustrates an enlarged view of the area 510 of FIG. 3B. There are two stop pins 24a assembled along the Z axis direction on the plate 27. There is a gap located between the stop pins 24a and the block 23. The rotation (θY), that moves the pipe shaft 22a as the center occurs in this gap. The amount of rotation is controlled by contact between the stop pins 24a and the block 23. The amount of parallel motion in the Z axis direction is controlled by contact between the side panels of the block 23 and the holder 25b. Even if the block 23 moved parallel in the Z axis direction, the block 23 can contact the stop pins 24a if it is within the range of the amount of motion.

Next, the movement of the floating joint 300a will be explained. FIG. 5A-5F illustrate when the parts on the mold A side have rotated with the Z axis as the center and when the parts on the mold A side have moved parallel to the Y axis direction. FIG. 6A-6F illustrate when the parts on the mold A side have rotated with the Y axis as the center and when the parts on the mold A side have moved parallel to the Z axis direction.

Figure 5A:
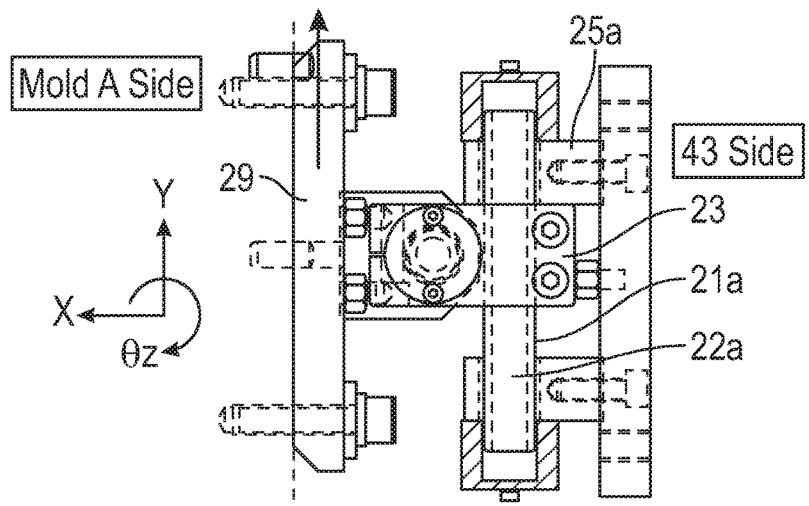
FIGS. 5A-5F illustrate when the parts on the mold A side have rotated with the Z axis as the center and when the parts on the mold A side have moved parallel to the Y axis direction.

FIG. 5A illustrates when the center position in the Y axis direction of the mold A is misaligned in the +Y axis direction with respect to the center position in the Y axis direction of the actuator 10. The actuator 10 is located at a side of the linking bracket 43. When the positions of the mold A and the actuator 10 are misaligned in the Y axis direction during the movement of the mold A, the parts (the parts fixed to the plate 29) on the mold A side, including the pipe shaft 22a and the block 23, move in the +Y axis direction due to the pipe shaft 22a sliding inside the holder 25a into which the oil-free bushing 21a has been inserted. This enables absorption of the load of the misalignment occurring in the Y axis direction of the actuator 10 and the mold A.

Figure 5B:
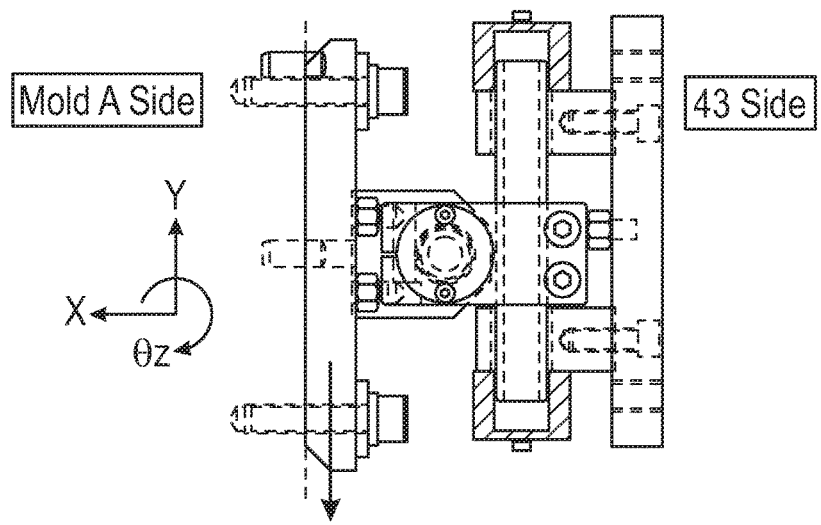

FIG. 5B illustrates when the center position in the Y axis direction of the mold A is misaligned in the −Y axis direction with respect to the center position in the Y axis direction of the actuator 10. In this case, the parts on the mold A side including the pipe shaft 22a and the block 23 move in the −Y axis direction due to the pipe shaft 22a sliding inside the holder 25a into which the oil-free bushing 21a has been inserted. This enables absorption of the load of the misalignment in the Y axis direction of the actuator 10 and the mold A.

When the mold A has moved in the Y axis direction, the parts on the mold A side can move in the Y axis direction with respect to the parts on the actuator 10 side via the pipe shaft 22a. As a result, the load to the actuator 10 and the linking unit 20 can be reduced. The greater the misalignment occurring in the Y axis direction of the mold A and the actuator 10, the greater the load applied to the linking unit 20 and the actuator 10 becomes. The configuration of the present embodiment enables reduction in or elimination of the applied load.

In another embodiment, if the linking unit 20 is not present, and the linking is accomplished by simply using, for example, a rod shaped component, depending on the misalignment of the center in the Y axis direction of the mold A in the Y axis direction against the center in the Y axis direction of the actuator 10, the weight of the mold A and the load of the movement portion in the Y axis direction will be applied to the actuator 10 and the linking component. This would result in the linking component bending bend against the Y axis direction, as well as the load in the Y axis direction being applied to the actuator 10. The linking unit 20 enables the mold A to move in the Y axis direction against the actuator 10, thus reducing the load to the linking unit 20 and the actuator 10.

Figure 5C:
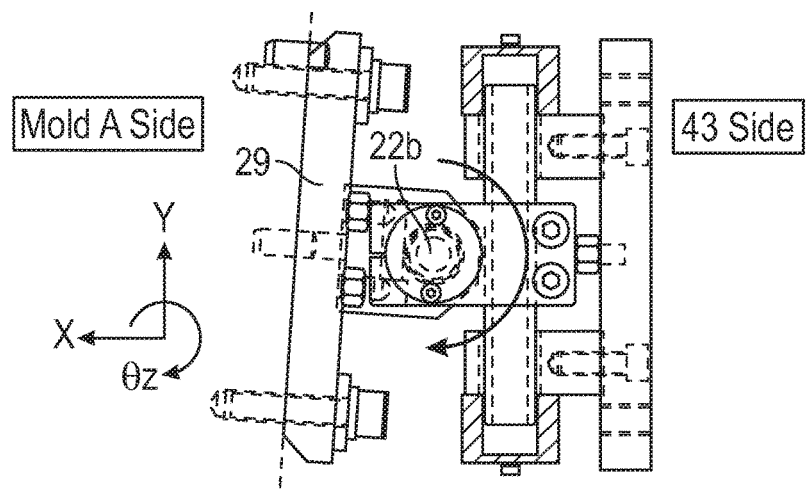

FIG. 5C illustrates when the center position in the θZ axis direction of the mold A has misaligned in the +θZ axis direction with respect to the center position in the θZ axis direction of the actuator 10. If the positions of the mold A and the actuator 10 are misaligned in the θZ axis direction during the mold clamping of the mold A, the parts (the parts fixed to the plate 29) on the mold A side will rotate in the +θZ axis direction via the pipe shaft 22b. This enables absorption of the load of the misalignment in the θZ axis direction of the actuator 10 and the mold A.

Figure 5D:
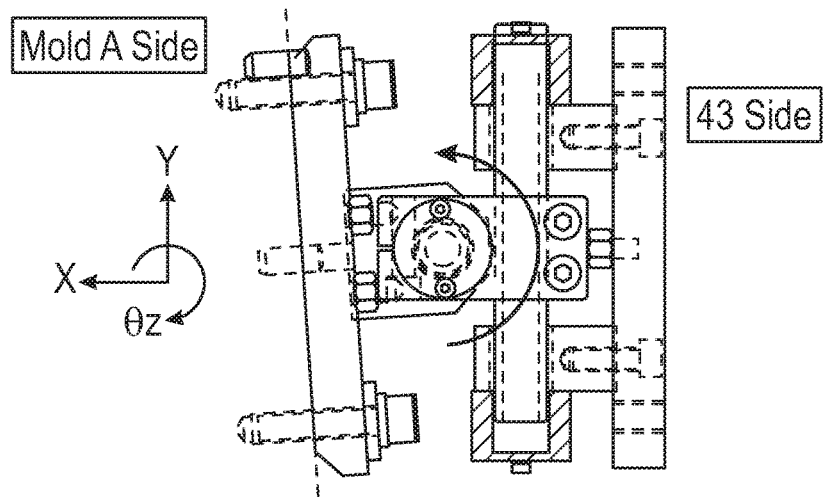

FIG. 5D illustrates when the center position in the θZ axis direction of the mold A has misaligned in the −θZ axis direction with respect to the center position in the θZ axis direction of the actuator 10. In this case, the parts on the mold A side will rotate in the −θZ axis direction via the pipe shaft 22b. This enables absorption of the load of the misalignment in the θZ axis direction of the actuator 10 and the mold A.

When the mold A has moved in the θZ axis direction, the parts on the mold A side can move in the θZ axis direction with respect to the parts on the actuator 10 side via the pipe shaft 22b. This enables reducing the load to the actuator 10 and the linking unit 20. The greater the misalignment occurring in the θZ axis direction of the mold A and the actuator 10, the greater the load applied to the linking unit 20 and the actuator 10 will become. The configuration of the present embodiment enables reduction in or elimination of the load that is applied.

In another embodiment, if the linking unit 20 is not present, and the linking is accomplished by simply using a rod shaped component, depending on the center in the θZ axis direction of the mold A having shifted in the θZ axis direction with respect to the center of the θZ axis direction of the actuator 10, the load of the movement portion in the θZ axis direction of the mold A due to mold clamping will be applied to the actuator 10 and the linking component. Consequently, the linking component bends in the θZ axis direction, and, in addition, the load in the θZ axis direction will also be applied to the actuator 10. The linking unit 20 of the present embodiment enables the mold A to move in the θZ axis direction against the actuator 10, thus reducing the load to the linking unit 20 and the actuator 10.

Figure 5E:
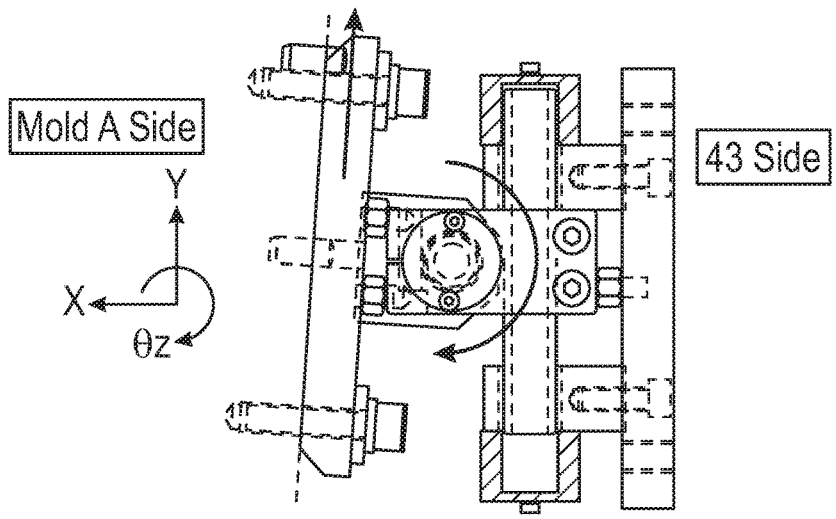

FIG. 5E illustrates when the center position in the Y axis direction of the mold A has shifted in the +Y axis direction with respect to the center position in the Y axis direction of the actuator 10, and when the center position in the θZ axis direction of the mold A has shifted in the +θZ axis direction of the mold A with respect to the center position in the θZ axis direction of the actuator 10. In this case, the parts on the mold A side, which includes the pipe shaft 22a and the block 23, will move in the +Y axis direction due to the pipe shaft 22a sliding inside the holder 25a into which the oil-free bushing 21a has been inserted. This enables absorption of the load of the misalignment that occurs in the Y axis direction of the actuator 10 and the mold A. The parts on the mold A side will rotate in the +θZ axis direction via the pipe shaft 22b. This enables absorption of the load of the misalignment that occurs in the θZ axis direction of the actuator 10 and the mold A.

Figure 5F:
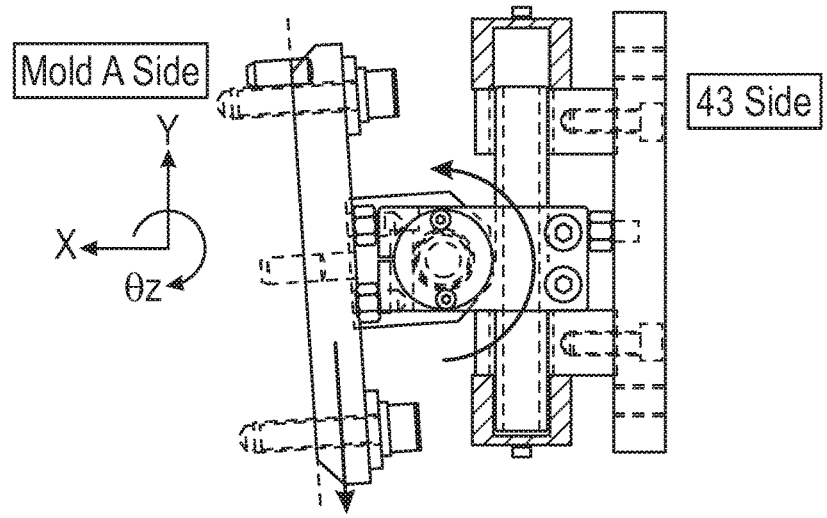

FIG. 5F illustrates when the center position in the Y axis direction of the mold A has shifted in the −Y axis direction with respect to the center position in the Y axis direction of the actuator 10, and when the center position in the θZ axis direction of the mold A has shifted in the −θZ axis direction with respect to the center position in the θZ axis direction of the actuator 10. In this case, the parts on the mold A side, including the pipe shaft 22a and the block 23, will move in the −Y axis direction due to the pipe shaft 22a sliding inside the holder 25a into which the oil-free bushing 21a has been inserted. This enables absorption of the load of the misalignment that occurs in the Y axis direction of the actuator 10 and the mold A. The parts on the mold A side will rotate in the −θZ axis direction via the pipe shaft 22b. This enables absorption of the load of the misalignment that occurs in the θZ axis direction of the actuator 10 and the mold A.

Figure 6A:
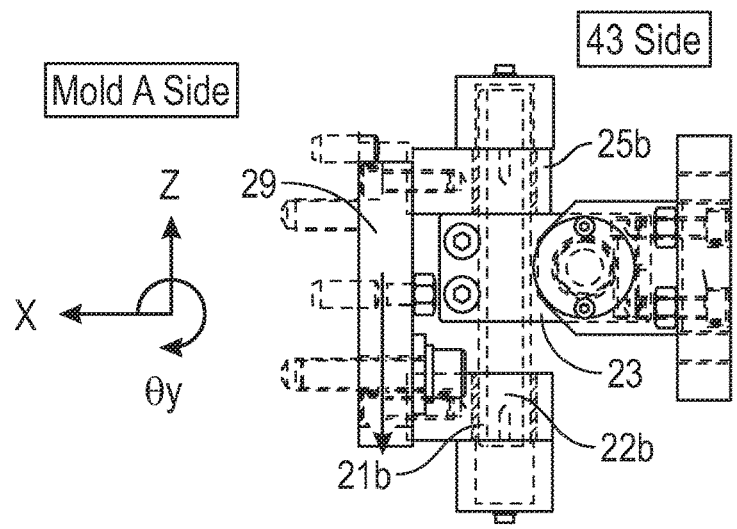
FIGS. 6A-6F illustrate the state when the parts on the mold A side have rotated with the Y axis as the center and when the parts on the mold A side have moved parallel to the Z axis direction.

FIG. 6A illustrates when the center position in the Z axis direction of the mold A has shifted in the −Z axis direction with respect to the center position in the Z axis direction of the actuator 10. In this case, the parts (parts fixed to the plate 29) on the mold A side will move in the −Z axis direction due to the pipe shaft 22b sliding inside the holder 25b into which the oil-free bushing 21b has been inserted. This enables absorption of the load of the misalignment that occurs in the Z axis direction of the actuator 10 and the mold A.

Figure 6B:
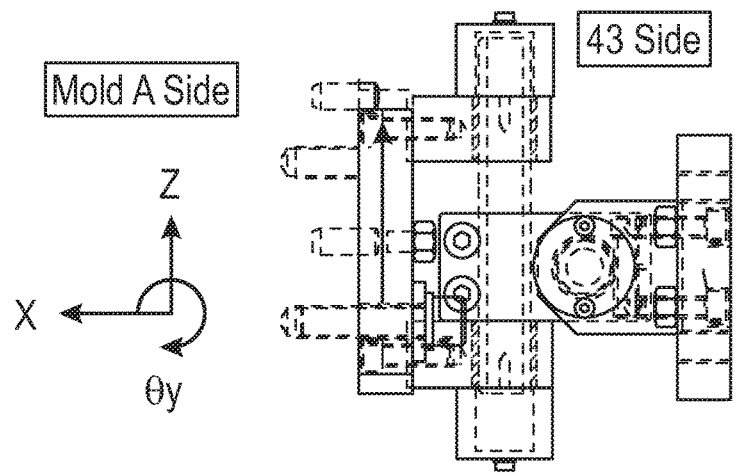

FIG. 6B illustrates when the center position in the Z axis direction of the mold A has shifted in the +Z axis direction with respect to the center position in the Z axis direction of the actuator 10. In this case, the parts on the mold A side will move in the −Z axis direction due to the pipe shaft 22b sliding inside the holder 25b into which the oil-free bushing 21b has been inserted. This enables absorption of the load of the misalignment that occurs in the Z axis direction of the actuator 10 and the mold A.

Figure 6C:
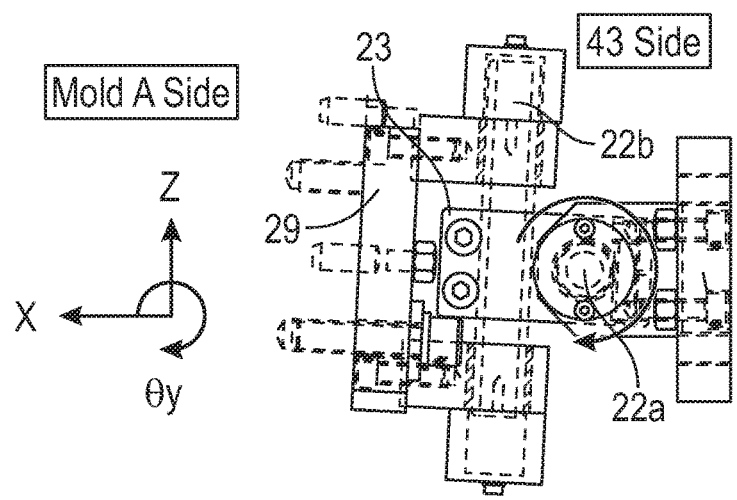

FIG. 6C illustrates when the center position in the θY axis direction of the mold A has shifted in the +θY axis direction with respect to the center position in the θY axis direction of the actuator 10. In this case, the parts (parts fixed on the plate 29) on the mold A side, which include the pipe shaft 22b and the block 23, will move in the +θY axis direction via the pipe shaft 22a. This enables absorption of the load of the misalignment in the θY axis direction of the actuator 10 and the mold A.

Figure 6D:
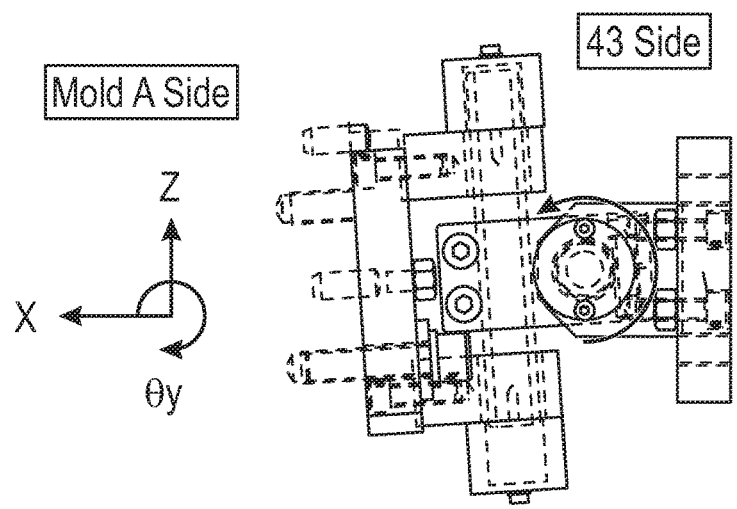

FIG. 6D illustrates when the center position in the θY axis direction of the mold A has shifted in the −θY axis direction with respect to the center position in the −θY axis direction of the actuator 10. In this case, the parts on the mold A side, including the pipe shaft 22b and the block 23, will rotate in the −θY axis direction via the pipe shaft 22a. This enables absorption of the load of the misalignment in the θY axis direction of the actuator 10.

Figure 6E:
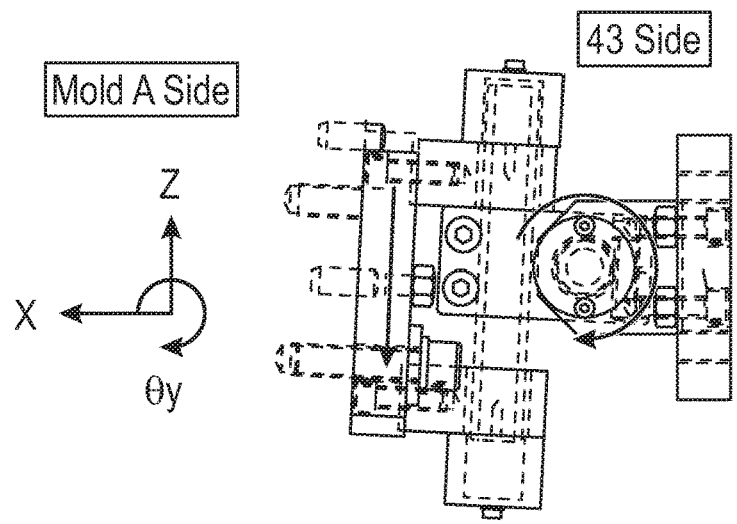

FIG. 6E illustrates when the center position in the Z axis direction of the mold A has shifted in the −Z axis direction with respect to the center position in the Z axis direction of the actuator 10, and when the center position in the in the θY axis direction of the mold A has shifted in the +θY axis direction with respect to the center position in the θY axis direction of the actuator 10. In this case, the parts on the mold A side will move in the −Z axis direction due to the pipe shaft 22b sliding inside of the holder 25b into which the oil-free bushing 21b has been inserted. This enables absorption of the load of the misalignment in the Z axis direction of the actuator 10 and the mold A. The parts on the mold A side, including the pipe shaft 22b and the block 23, will rotate in the +θY axis direction via the pipe shaft 22a. This enables absorption of the load of the misalignment in the θY axis direction of the actuator 10 and the mold A.

Figure 6F:
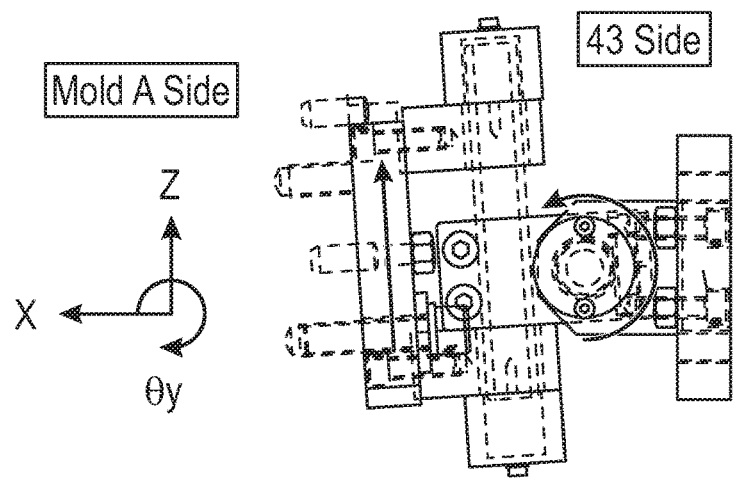

FIG. 6F illustrates when the center position in the Z axis direction of the mold A has shifted in the −Z axis direction with respect to the center position in the Z axis direction of the actuator 10, and when the center position in the θY axis direction of the mold A has shifted in the −θZ axis direction with respect to the center position in the θY axis direction of the actuator 10. In this case, the parts on the mold A side will move in the −Z axis direction due to the pipe shaft 22b sliding inside the holder 25b into which the oil-free bushing 21b has been inserted. This enables absorption of the load of the misalignment in the Z axis direction of the actuator 10 and the mold A. The parts on the mold A side, including the pipe shaft 22b and the block 23, will rotate in the −θY axis direction via the pipe shaft 22a. This enables absorption of the load of the misalignment in the θY axis direction of the actuator 10 and the mold A.

The above-described configuration provides that the parts that fasten the pipe shafts 22a and 22b with the block 23 can slide in the Y axis, Z axis, θY axis, or θZ axis directions inside of the holders 25a and 25b into which the oil-free bushings 21a and 21b have been inserted. This enables reducing the load of the misalignment of the mold A and the actuator 10 in the Y axis, the Z axis, the θY axis, and the θZ axis direction respectively.

The above-described configuration ensures that no surplus load is applied to the linking unit 20, the linking unit 40, and eventually the actuator 10, reduces the possibility of damage to the linking unit 20 and the linking unit 40, and can reduce the possibility of damage to the actuator 10. Typically, if a load applied to the actuator 10 is large, selection of a large actuator is needed in consideration of the load. The configuration of the present embodiment avoids this, which can result in cost reduction. By selecting the above-described configuration, excessive position adjustments of the conveyor device 100B against the injection molding machine 600 and excessive position adjustments of the side guide roller 47 and the bottom guide roller 47 become unnecessary. This can result in cost savings due to precision loosening of the equipment parts and a reduction of the assembly man-hours during assembly.

The linking unit 20 and the linking unit 40 of the present embodiment can be detached from the mold A and mold B respectively using a simple method. The following description will just refer to the linking unit 20 and the floating joint 300a as examples, but is applicable to the linking unit 40 and the floating joint 300b.

Figure 7A:
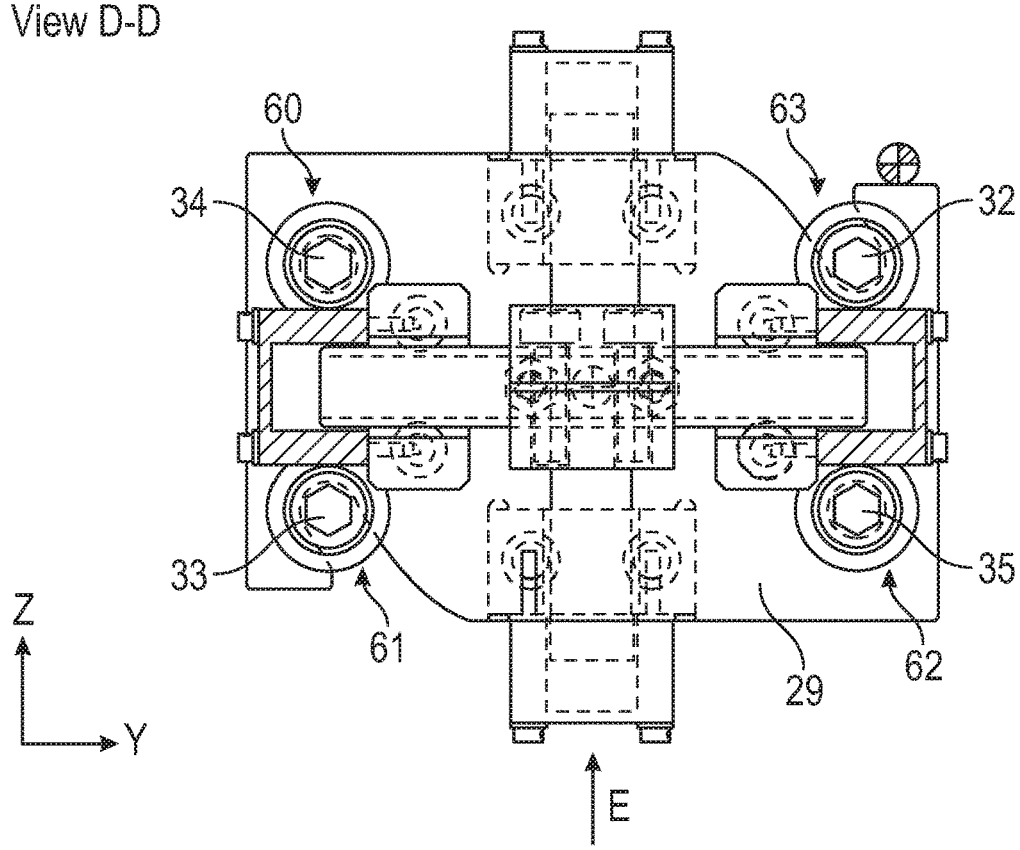
FIG. 7A illustrates an enlarged view of FIG. 3C.
Figure 7B:
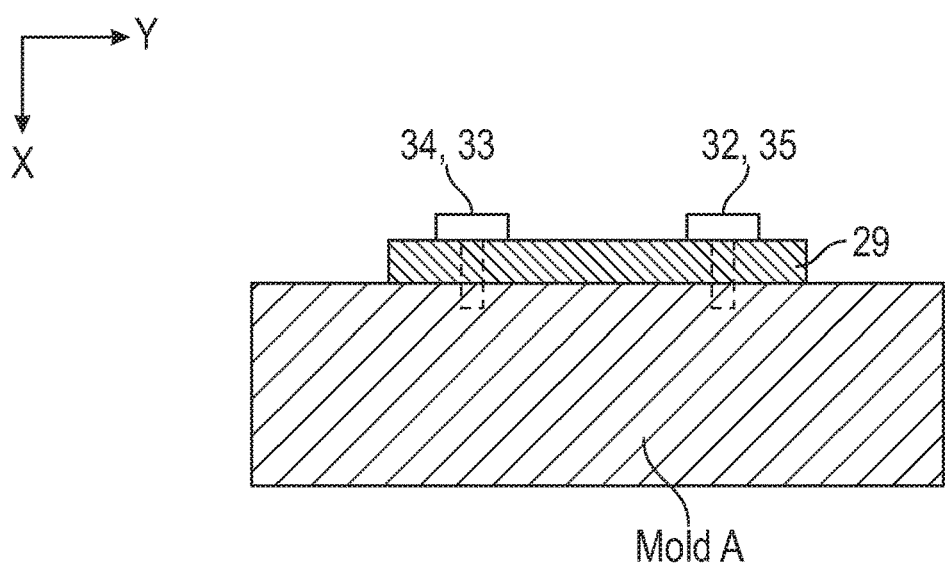
FIG. 7B illustrates when each component of FIG. 7A is viewed from the direction of the arrow E.

FIG. 7A illustrates an enlarged view of FIG. 3C. In FIG. 7A, the round holes 60 and 62 are formed in two locations of the plate 29. In two different locations, the slits 61 and 63 of the U-shapes are formed. The bolts 34 and 35 (attachment members) are inserted in the round holes 60 and 62 respectively, and the bolts 33 and 32 are inserted in the slits 61 and 63 respectively. FIG. 7B illustrates when each component of FIG. 7A is viewed from the direction of the arrow E. The four bolts are inserted via the rear of the plate 29, which is fixed to the mold A.

Figure 8A:
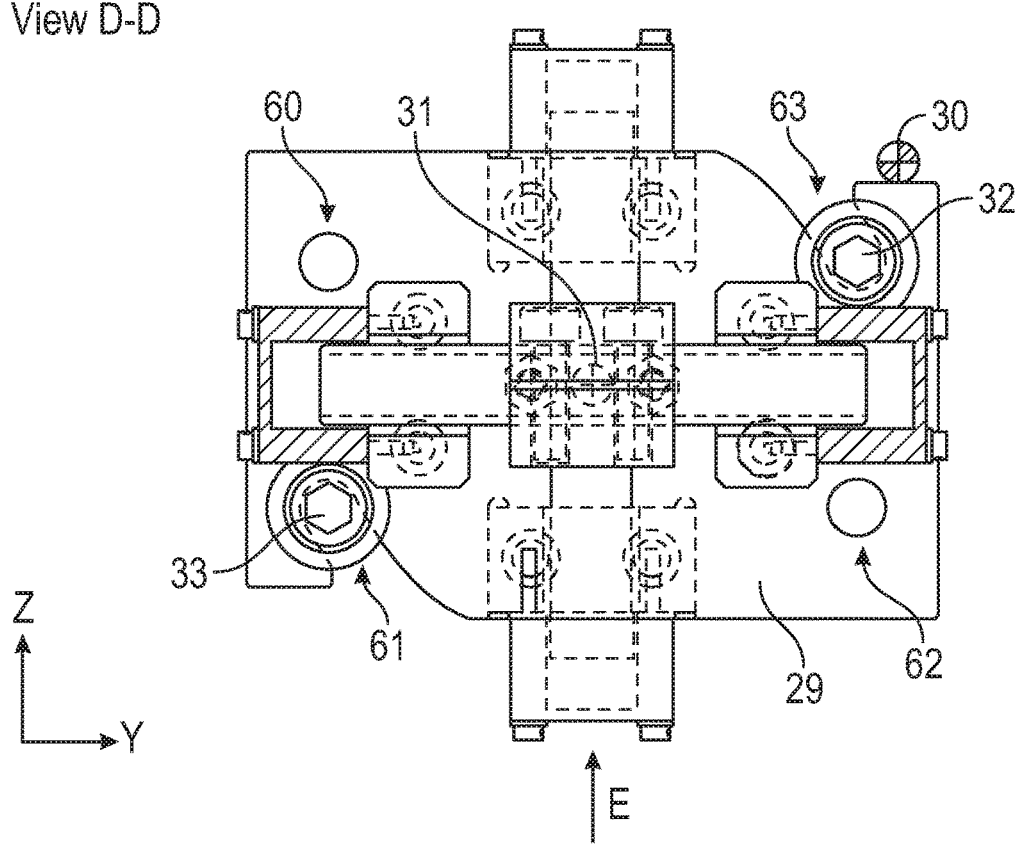
FIG. 8A illustrates when the bolts 34 and 35 are removed from the round holes 60 and 62.
Figure 8B:
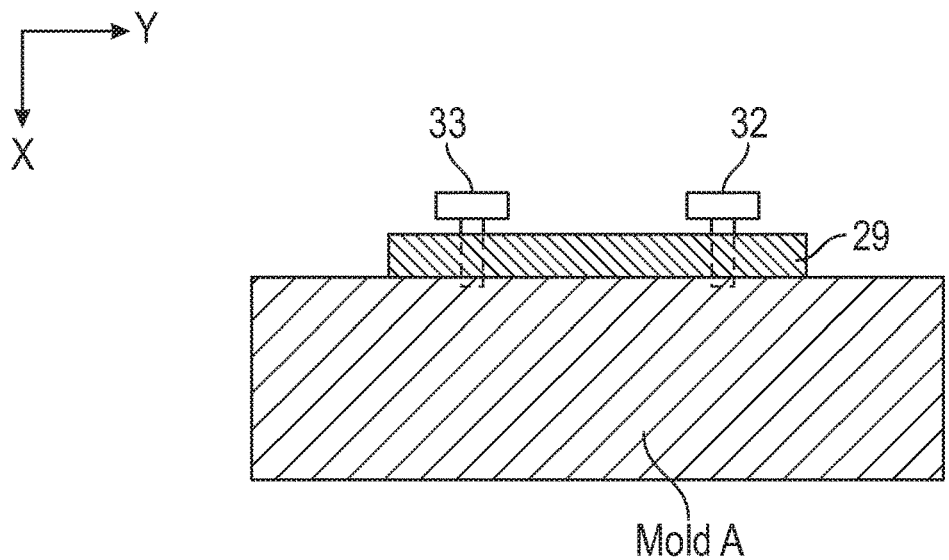
FIG. 8B illustrates when each of the components of FIG. 8A are viewed from the direction of the arrow E.

When detaching the plate 29 from the mold A, the bolts 34 and 35 are removed from the round holes 60 and 62, and the bolts 33 and 32 are loosened since they do not need to be completely removed. FIG. 8A illustrates when the bolts 34 and 35 are removed from the round holes 60 and 62. FIG. 8B illustrates when each of the components of FIG. 8A are viewed from the direction of the arrow E.

Because the U-shaped slits 61 and 63 are formed in the plate 29, the plate 29 and the floating joint 300a can easily be removed from the mold A by letting the plate 29 rotate in a clockwise direction as illustrated in FIG. 9A. FIGS. 9A-9C correspond to FIGS. 2C-2E respectively (This configuration enables the floating joint 300a as well as the linking bracket 44 and the floating joint 300b to be easily removed via the same steps.

While the direction to let the linking bracket 44 and the floating joint 300b rotate is in reverse, this can be achieved because the configuration is such that the linking bracket 44 and the floating joint 300b can be separated from each other. In another exemplary embodiment, a configuration is provided such that that the direction to let the linking bracket 44 and the floating joint 300b rotate in is the same, and the two components are removed together.

The above-described configurations can be applicable for installing components in addition to removing them. For example, with respect to the floating joint 300a of the linking unit 20, the plate 29 can be fit using the bolts 33 and 32 in the positions corresponding to the slits 61 and 63 inserted into the mold A.

As described above, the positioning pins 30 and 31 are installed in the mold A, and there is a hole formed in the plate 29 to fit the positioning pin 31. The mold A and the plate 29 are assembled so the positioning pin 31 will fit in and enable the plate 29 to rotate in a counter clockwise direction as illustrated in FIG. 8A. The plate 29 stops in the location where it contacts the positioning pin 30. Along with the rotation, the bolts 33 and 32, which are already inserted into the mold A, move inside the plate 29 along the slits 61 and 63. Installation is completed by inserting and fastening the bolts 34 and 35 into the round holes 60 and 62, and additional fastening of the bolts 33 and 32.

Figure 10:
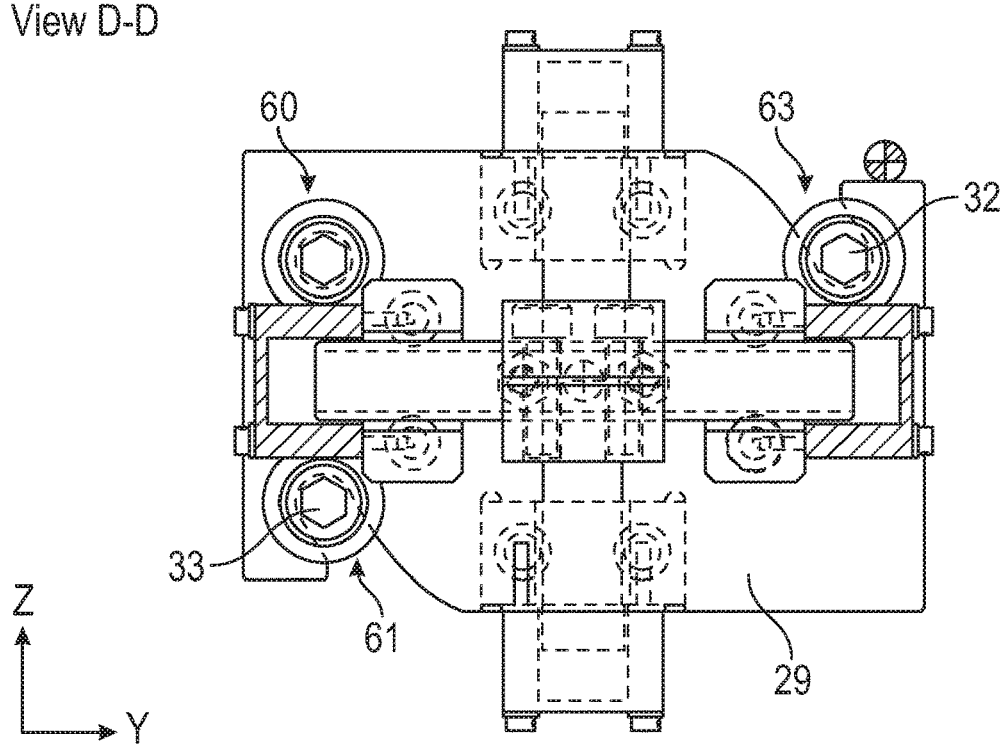
FIG. 10 illustrates a configuration to remove and install the linking unit 20.
Figure 11:
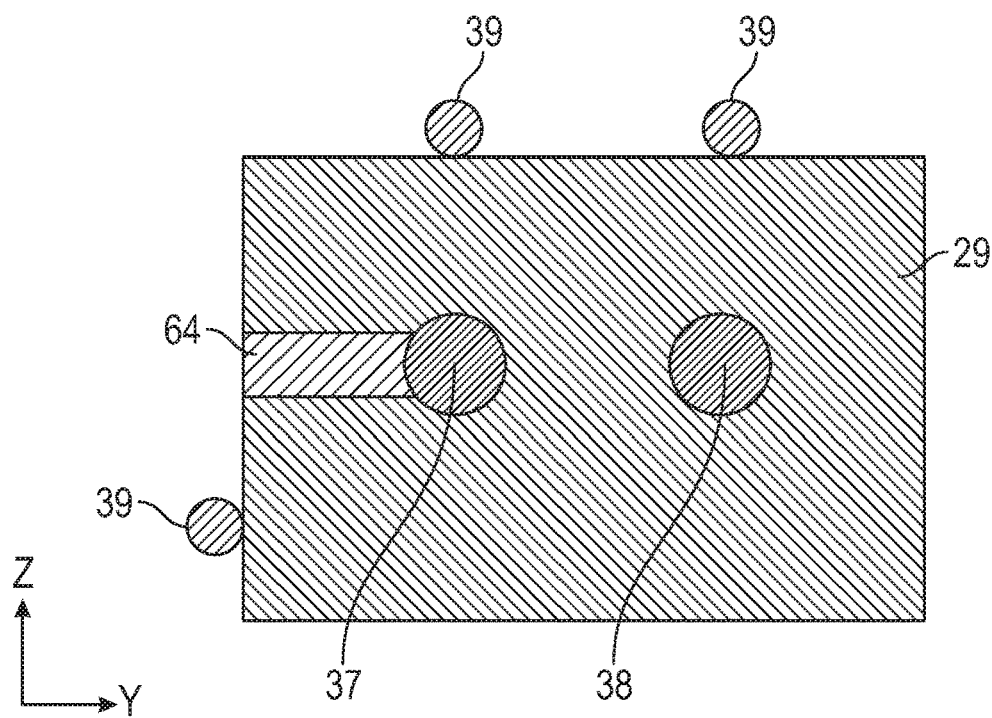
FIG. 11 illustrates a configuration to remove and install the linking unit 20.

The above-described configuration is not seen to be limiting with respect to being the configuration to remove and install the linking unit 20. For example, in another embodiment, as illustrated in FIG. 10, there can be three locations where bolts are attached. In another embodiment, as illustrated in FIG. 11, the plate 29 need not always rotate, and it can be a configuration that enables moving the plate 29 by sliding it. The configuration can also include at least one round hole and one slit formed in the plate 29.

Turning to in FIG. 11, the slit 64 is formed along the Y axis direction in the plate 29, and the bolt 37 is inserted via the slit 64. A round hole is formed in the plate 29, and the bolt 38 is inserted into the round hole. Removing the plate 29 includes removing the bolt 38, loosening the bolt 37, and sliding the plate 29 in the +Y axis direction. Installing the plate includes sliding the plate 29 in the −Y axis direction with the bolt 37 inserted. To accurately determine the fixing position of the plate 29, the positioning pin 39 is arranged in the mold A so the plate 29 can push against it.

In the present embodiment, the direction in which the slit 64 is formed refers to the direction towards the open end of the slit 64. In other words, the counter clockwise direction in the examples of FIG. 7A and FIG. 8A and the −Y axis direction in the example of FIG. 11 is the direction in which the slit 64 is formed. The plate 29 can be detached from the mold A by moving the plate 29 in the opposite direction of the direction in which the slit 64 is formed. The plate 29 can be installed into the mold A by moving the plate 29 in the direction in which the slit 64 is formed.

In the present embodiment, the bolts attached in the locations of the slits were loosened when removing the linking unit 20. This is not seen to be limiting. Depending on the size of the slits and the size of the bolts, it is possible to remove or install the plate 29 without loosening the bolts that are installed in the locations of the slits.

Next, a description of the configurations of the molds A and B of the present embodiment will be provided. Because the configuration of the mold A and the mold B is the same, the following description will just refer to the mold A, but is applicable to the mold B.

Figure 12B:
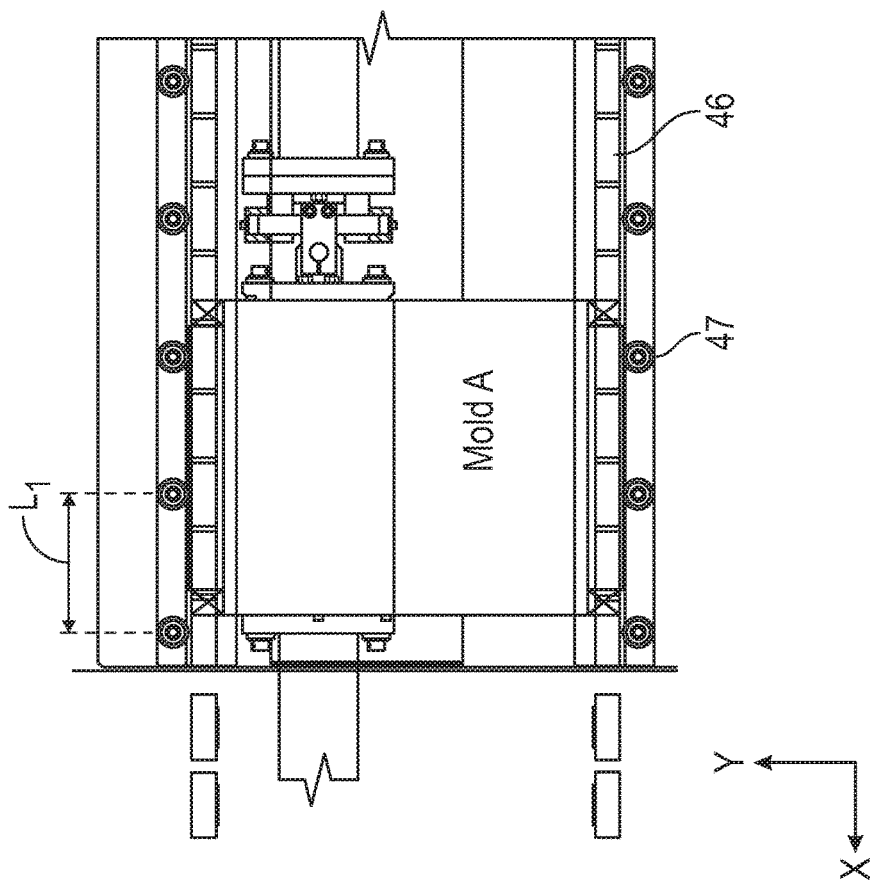
FIG. 12B illustrates an enlarged top view of the mold A.
Figure 12A:
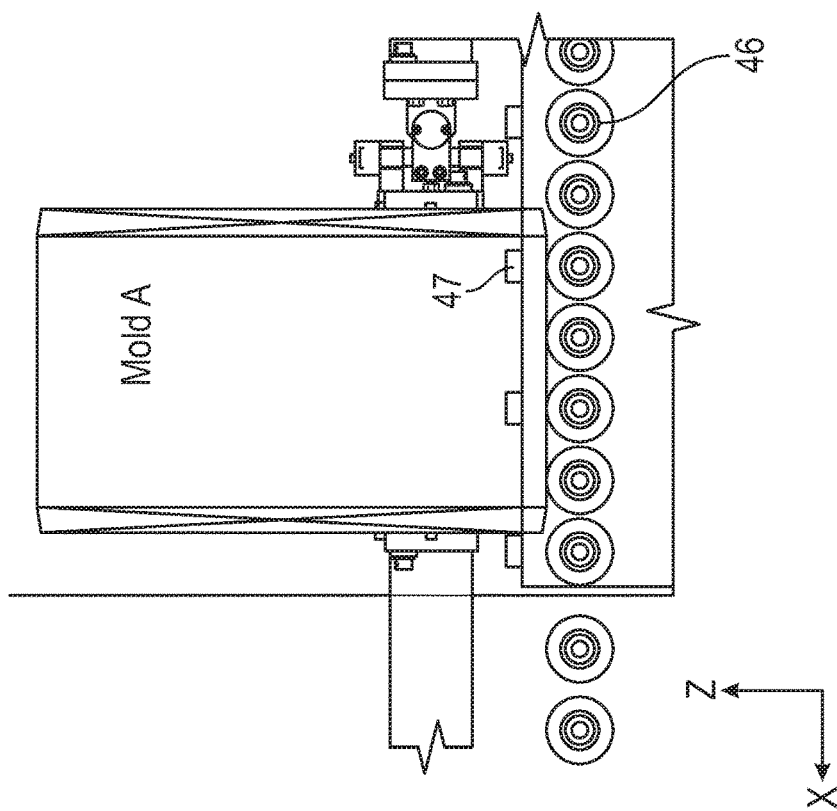
FIG. 12A illustrates an enlarged side view of the mold A.

FIG. 12A illustrates an enlarged side view of the mold A, while FIG. 12B illustrates an enlarged top view of the mold A. The mold A is guided by the bottom guide rollers 46 and the side guide rollers 47 during movement due to the actuator 10. There are gaps between each of the rollers, and there are individual differences between the sizes of each roller. This can result in a large load being applied to the rollers when the mold A is left on the rollers when the mold A is transferring between rollers, This situation can damage the rollers. In addition, this situation can also lead to damaging the linking unit 20 and the actuator 10.

To overcome the above-described situation, in the present embodiment, the contact surface with each roller of the mold A is tapered. As illustrated in FIG. 12A, the tapered parts are inclined in a direction in which the bottom guide rollers 46 are arranged. As illustrated in FIG. 12B, the tapered parts are inclined in a direction in which the side guide rollers 47 are arranged.

Figure 13C:
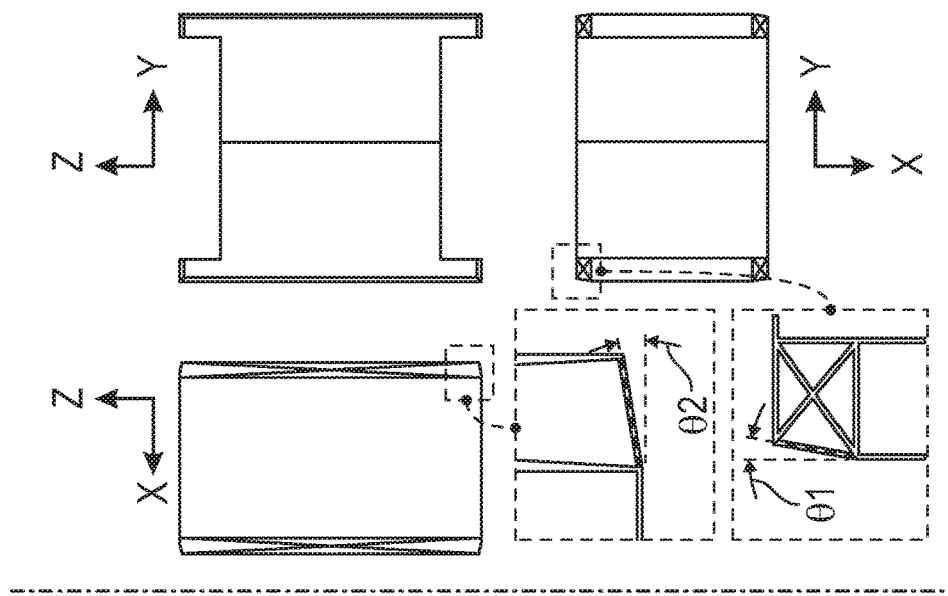
FIG. 13C illustrates a trihedral figure in a case where the surface where the mold A contacts the side guide rollers 47 and the surface where it contacts the bottom guide rollers 46 is tapered.
Figure 13B:
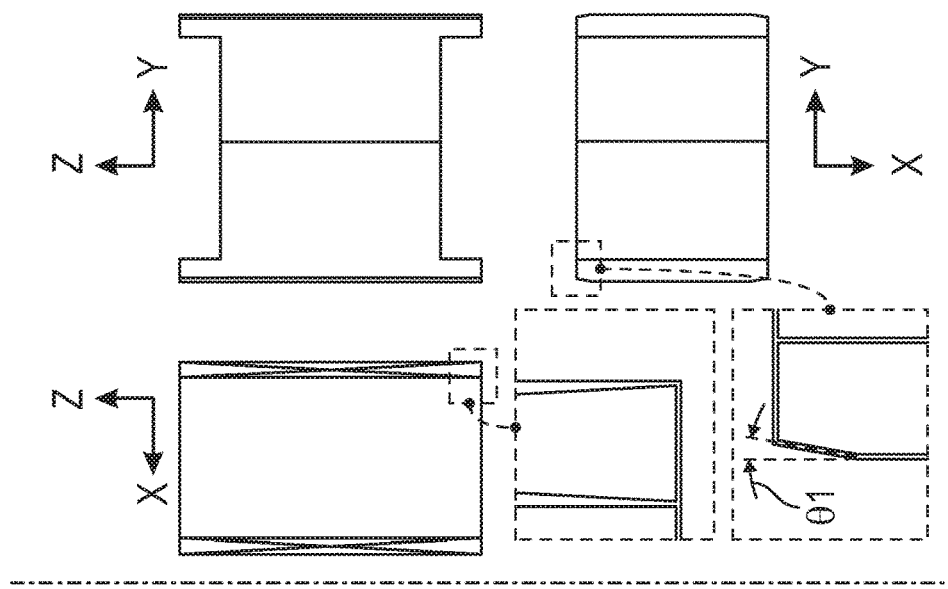
FIG. 13B illustrates a trihedral figure in a case where the surface where the mold A contacts the side guide rollers 47 is tapered.
Figure 13A:
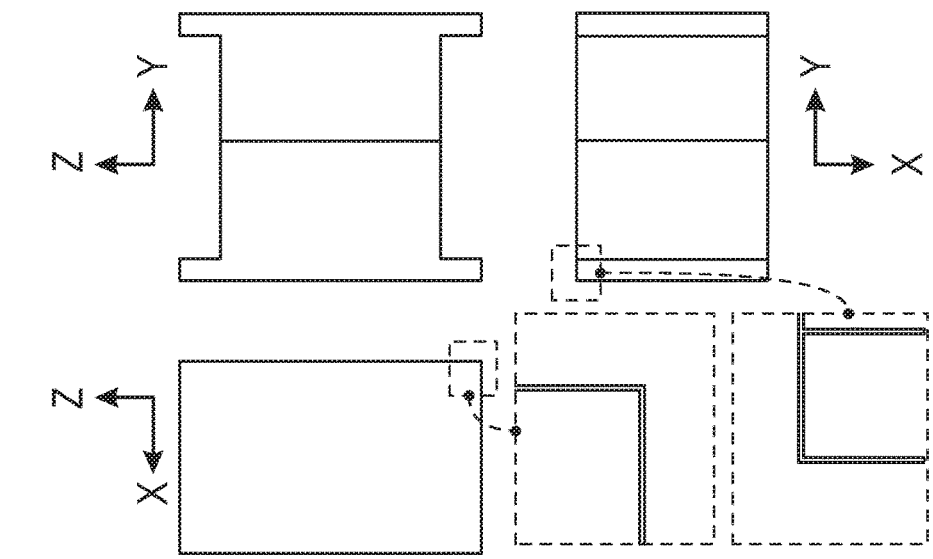
FIG. 13A illustrates a trihedral figure in a case where the mold A is not tapered.

FIG. 13A is a trihedral figure in a case where a mold is not tapered. This shape does not enable smooth transfer between rollers when a large load is applied to the rollers during transfer between the rollers. As a result, the rollers and the mold can interfere with each other, which could impact transfer of the mold.

FIG. 13B is a trihedral figure in a case where the surface where the mold A contacts the side guide rollers 47 is tapered. As illustrated in FIG. 13B, the movement between the side guide rollers 47 can be smooth by forming a taper with an angle of θ1.

FIG. 13C is a trihedral figure in a case where the surface where the mold A contacts with the side guide rollers 47 and the surface where it contacts the bottom guide rollers 46 is tapered. As illustrated in FIG. 13C, the movement between the side guide rollers 47 can be smooth by forming a taper with an angle of θ1. In addition, the movement between the bottom guide rollers 46 can be smooth by forming a taper with an angle of θ2 in the four locations that comprise contact surface with the mold A and the bottom guide rollers 46.

Figure 14:
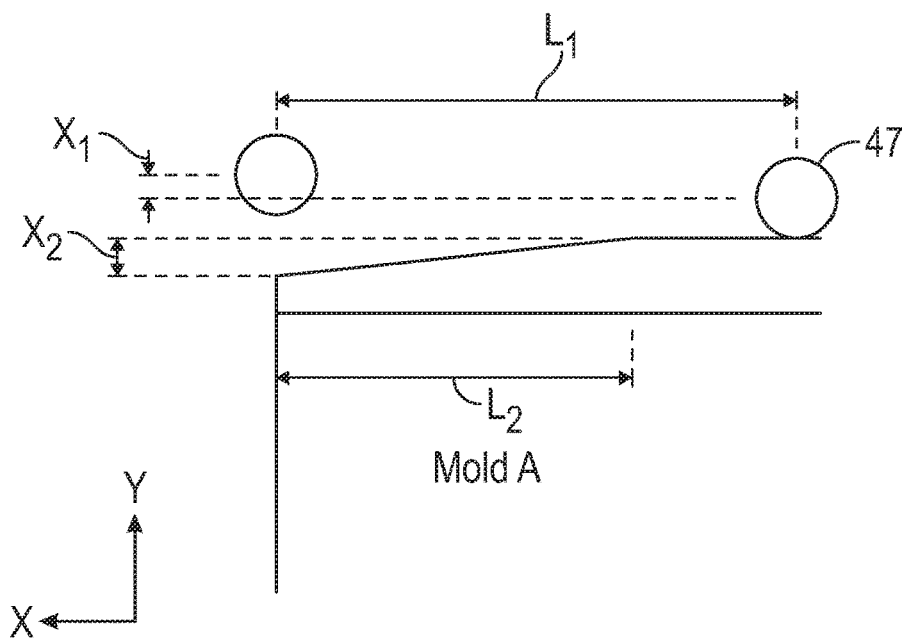
FIG. 14 illustrates a top view of the contact positions of the side guide rollers 47 and the mold A.

FIG. 14 is a top view of the contact positions of the side guide rollers 47 and the mold A. The determination method for the smallest dimension of the taper to be machined in the mold A will be described with respect to FIG. 14.

The space in the X axis direction of the two side guide rollers 47 is L1, and the misalignment amount in the Y axis direction of the two side guide rollers is X1. Because the position of the mold A will be stable if the mold A contacts the current side guide roller 47 until just before it transfers to the next side guide roller 47, the taper length L2 of the mold A is shorter than the space L1 between the two side guide rollers 47. In other words, a relation of L2<L1 is created.

There are individual differences in the size of the side guide rollers 47, as well as variations in the installation positions. Together, these form the misalignment amount X1 that occurs in the Y axis direction. To ensure that the mold A does not interfere with the side guide rollers 47 during transfer due to the misalignment in the Y axis direction of the side guide rollers 47, the length in the Y axis direction of the taper is a relation of X2>X1.

Figure 15:
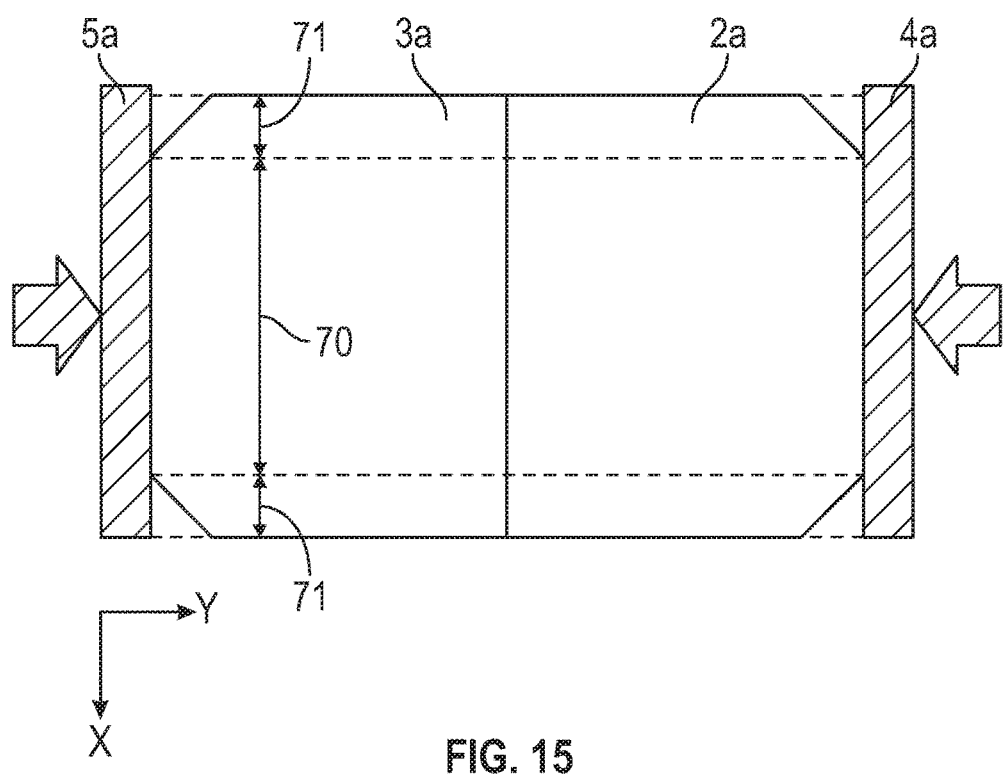
FIG. 15 illustrates a top view of the mold A.

When tapering the side panel of the mold A, the location that is tapered may not have sufficient strength during the mold clamping motion of the mold A. This situation is illustrated in FIG. 15. FIG. 15 is a top view of the mold A, and illustrates the stationary platen 4a, which makes contact with the stationary mold 2a, and the movable platen 5a, which makes contact with the movable mold 3a. The stationary platen 4a is clamped by a clamp mechanism (not illustrated), and force is applied to the stationary mold 2a in the direction of the illustrated arrows. The movable platen 5a is clamped by a clamp mechanism (not illustrated), and force is applied to the movable mold 3a in the direction of the illustrated arrows.

As a result of the taper, the range where the stationary platen 4a does not contact the stationary mold 2a and the range where the movable platen 5a does not contact the movable mold 3a is formed. In FIG. 15, the area sandwiched by these ranges in the Y axis direction is indicated by reference number 71. The area sandwiched, in the Y axis direction, between the range where the stationary mold 2a and the stationary platen 4a make contact and the range where the movable mold 3a and the movable platen 5a make contact is indicated by reference number 70. Because the force transmitted from both sides in area 71 is less than in area 70, the force could affect the molded parts. Thus, the cavity for mold A to make molded parts exists just in the area 70.

As described above, smooth transfer with a small load can be realized by forming tapered surfaces for the direction in which the rollers are arranged in the side panels and bottom panel of the mold A.

In the present embodiment, both sides of the side panels and bottom panel are tapered in the Y axis direction. In another exemplary embodiment, the configuration is such that only one side is tapered in the Y axis direction. In another exemplary embodiment, both sides in the X axis direction of the side panels and the bottom panel are tapered. In still yet another exemplary embodiment, the configuration is such that only one side is tapered in the X axis direction.

In the present embodiment, a part of the side surface of the mold A is tapered. In another exemplary embodiment, the configuration is such that the entire side surface of the mold A.

In the above-described exemplary embodiment, the floating joint 300a is installed on the mold A. In another exemplary embodiment, the floating joint 300a can be installed on the actuator 10. In the above-described exemplary embodiment, the floating joint 300b is installed on the mold B. In another exemplary embodiment, the floating joint 300b can be installed on the mold A.

In the above-described exemplary embodiment, the drive unit 100A is installed just on the conveyor device 100B, and the mold A and the mold B are linked with the linking unit 40. In another exemplary embodiment, illustrated in FIG. 16A and FIG. 16B, the mold A and the mold B are not linked. In that case, the linking unit 20 includes the floating unit 300 and the linking bracket 43

Figure 16A:
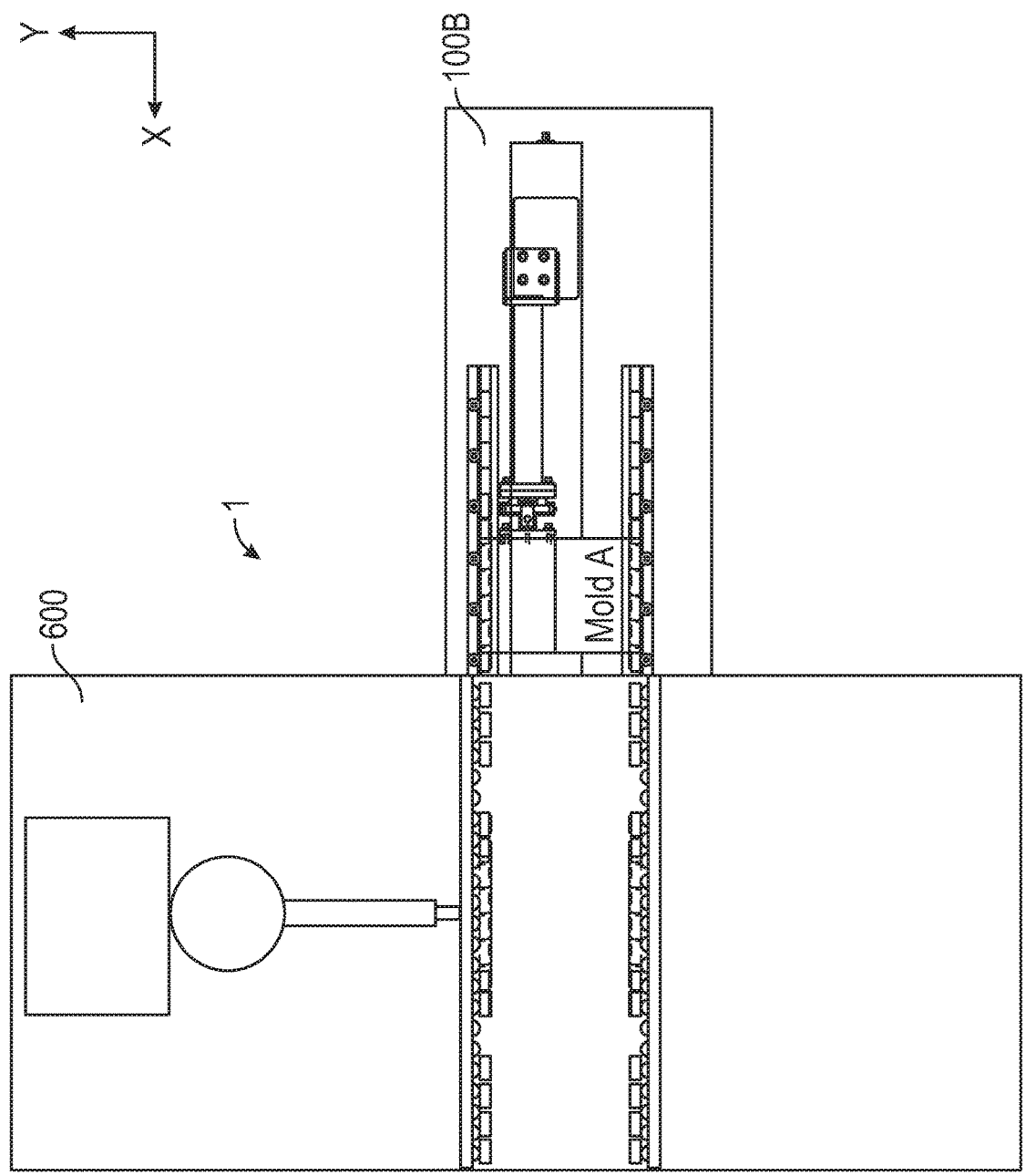
FIG. 16A and FIG. 16B illustrate a configuration where the mold A and the mold B are not linked.
Figure 16B:
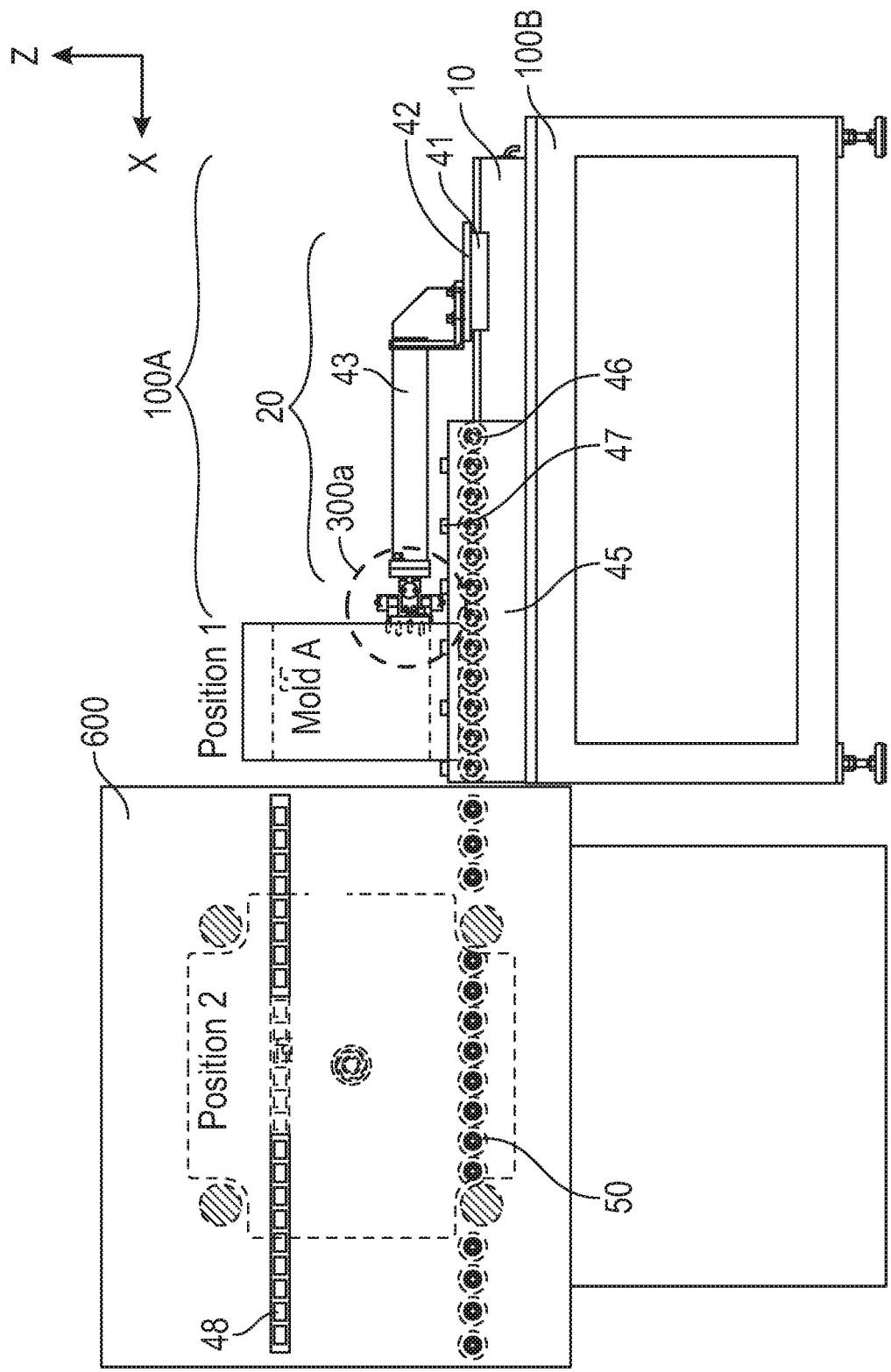

In the configuration illustrated in FIG. 16A and FIG. 16B, the conveyor device 100C (not illustrated), including a separate actuator (not illustrated) linked to the mold B (not illustrated), can be located on the opposite side of the injection molding machine 600 from the conveyor device 100B. The linking unit between that actuator 10 and the mold B has the same configuration as the linking unit 20 illustrated in FIG. 16A and FIG. 16.

The above description discussed approaches for handling, misalignment in the Y axis direction, the Z axis direction, the θY axis direction, and the θZ axis direction. The above-described approaches are not seen to be limiting. In another exemplary embodiment, only the misalignment in the Z axis direction and the θZ axis direction due to mold clamping or mold transfer are handled.

FIG. 17A illustrates a top view of the linking unit 20, the linking unit 40 and the molds A and B. FIG. 17B illustrates a side view of the linking unit 20, the linking unit 40, and the molds A and B. FIGS. 17A and 17B are similar to FIGS. 2A and 2B, with the only difference being the configuration of the floating joints 500a and 500b. As such, the previous description regarding FIGS. 2A and 2B are applicable to FIGS. 17 and 17B.

Next, the details of the floating joints 500a and 500b will be described. Because the floating joints 500a and 500b have the same configuration, the following description will just refer to the floating joint 500a, but is applicable to the floating joint 500b. FIG. 18A illustrates a top view of the floating joint 500a, FIG. 18B illustrates a side view of the floating joint 500a, and FIG. 18C illustrates the cross section D, illustrated in FIG. 18B, viewed from the direction of the arrow "D".

As illustrated in FIG. 18A and FIG. 18B, the floating joint 500a is equipped with the pipe shaft 22b, which extends in the Z axis direction. The pipe shaft 22b is clamped in the Y axis direction with the two bolts 36b, and it is fixed against the block 51.

The plate 29 is fastened to the mold A, and the block 51 is fastened to the linking bracket 43. As illustrated in FIG. 18C, the positioning pin 30 and the positioning pin 31 are installed on the mold A. A precision hole is opened for the positioning pin 31 in the center of the plate 29 in advance. The mold A and the plate 29 are assembled so the positioning pin 31 will fit. The plate 29 rotates in a counter clockwise direction as illustrated in FIG. 18C. At the location where the plate 29 contacts the positioning pin 30, the plate 29 is fastened to the mold A with the four bolts 32-35.

The pipe shaft 22b is secured on both ends by two holders 25b into which the oil-free bushing 21b has been inserted, and can move by sliding in the Z axis direction. The two holders 25b are fixed on the plate 29. To improve the slidability of the pipe shaft 22b, the lid 26b is installed on the holder 25b to seal it, and grease 28b is applied on the inner surface of the lid 26b. Because the pipe shaft 22b is not fixed to the holder 25b, each part that is fixed on the plate 29 can rotate with the pipe shaft 22b as the axis. In other words, rotation occurs with the Z axis as the center of rotation.

Figure 19:
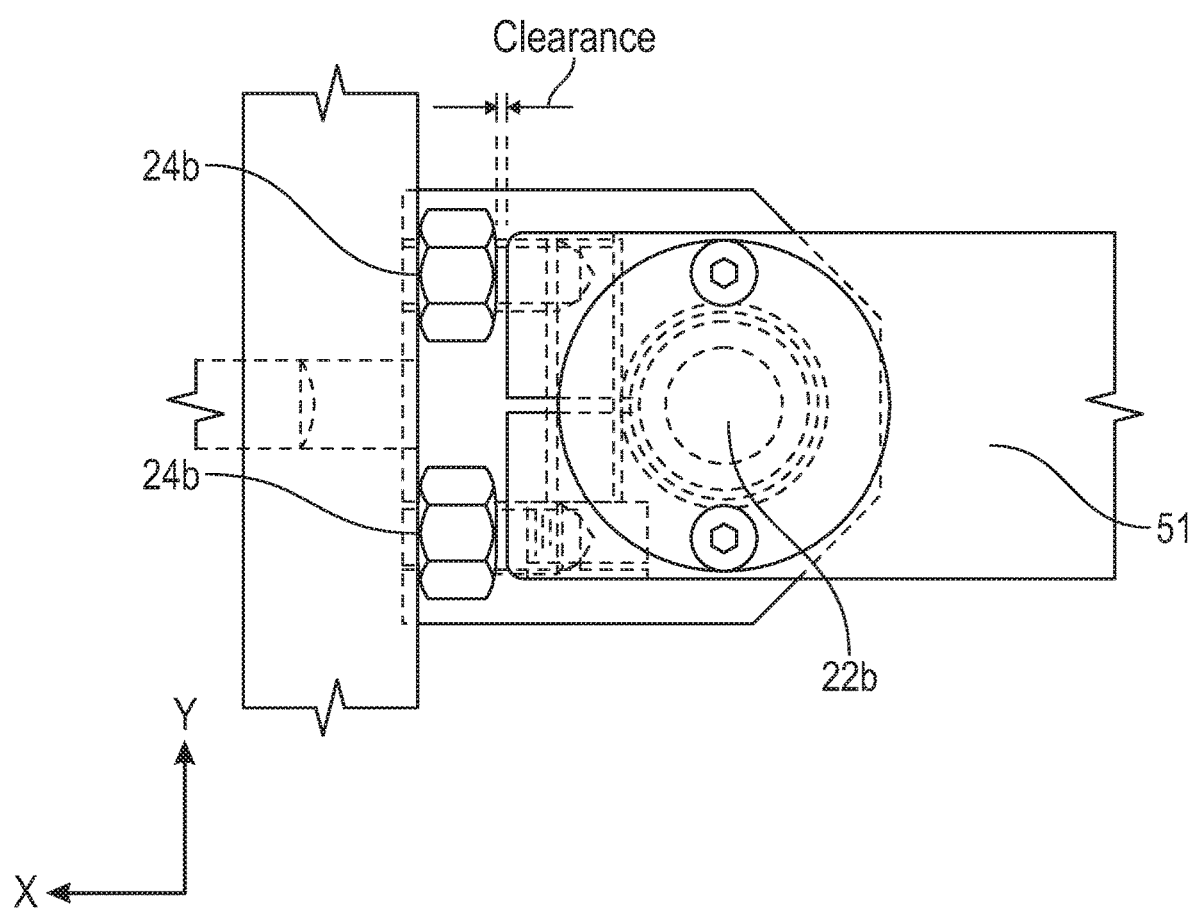
FIG. 19 illustrates an enlarged figure of the area 800.

FIG. 19 illustrates an enlarged figure of the area 800. Two stop pins 24b are installed along the Y axis direction on the plate 29. A gap is provided between the stop pins 24b and the block 51. The rotation (θZ) with the pipe shaft 22b as the center occurs in the area of the gap. The rotation amount is controlled by the stop pins 24b and the block 51 contacting each other. The parallel movement amount in the Z axis direction is controlled by the side panels of the block 51 and the holder 25b contacting each other.

As described above, the part that fastens the pipe shaft 22b with the block 51 includes a configuration that enables sliding in the Z axis and θZ axis direction inside of the holder 25b into which the oil-free bushing 21b has been inserted. The enables reduction in the load of the misalignment in the Z axis and the θZ axis directions of the mold A and the actuator 10.

The above-described exemplary embodiment discussed a configuration with the mold A or the mold B moving on the rollers lined up in the X axis direction. This configuration is not seen to be limiting. In another exemplary embodiment, even if the rollers are attached to the molds themselves, and they move on the top panel of the frame of the conveyor device 100B and 100C, the above-described configuration of the linking unit is applicable.

While the above-described embodiment references oil-free bushings 21a and 21b, these are not seen to be limiting. Any component that provides slidability, such as a metal component that can slide, is applicable. The term "slidability" in the present context refers to a component that can move with a low friction coefficient against the internal surface of the round hole.

The above-described exemplary embodiment discusses a dispersion method of the load due to misalignment of the mold in the configuration with two pipe shafts and oil-free bushings. This configuration is not seen to be limiting. Any configuration that enables dispersion of the load in the Y axis direction, Z axis direction, θY axis direction, and θZ axis direction generated by the misalignment of each mold when the direction in which multiple molds move together is taken as the X axis direction by the actuator is applicable.

In the above-described exemplary embodiment, the pipe shaft rotates in the θY axis direction and moves in the Y axis direction, and rotates in the θZ axis direction and moves in the Z axis direction. In another exemplary embodiment, the pipe shaft can rotate in the θY axis direction and the θZ axis direction with a bushing part, such as a bearing, and move in the Y axis direction and the Z axis direction, with a linear motion guide machine part such as a separate linear guide.

In another exemplary embodiment, several molds are placed on one slider (belt conveyer) to transfer the molds. In this embodiment, multiple molds can be moved with one actuator, and injection and molding conducted efficiently and at low cost.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An injection molding system comprising:
   at least two molds;
   an injection molding machine;
   at least one conveyor device configured to convey the at least two molds to/from the injection molding machine;
   a linking unit configured to connect the at least two molds, wherein the linking unit comprises a first connection member for connecting to a first mold of the at least two molds and a second connection member for connecting to a second mold of the at least two molds,
   wherein, with the first mold connected to the first connection member and the second mold connected to the second connection member, movement of the linking unit moves both the first mold and the second mold,
   wherein the first connection member includes a slit configured to receive an attachment member for connecting the linking unit and the first mold, and
   wherein the slit includes a shape such that a connection between the linking unit and the first mold established by the attachment member is released based on movement of the first connection member.

2. The injection molding system of claim 1, wherein the slit is a straight shape, and the connection between the linking unit and the first mold established by the attachment member is released based on linear movement of the first connection member.

3. The injection molding system of claim 1, wherein the slit is a curved shape, and the connection between the linking unit and the first mold established by the attachment member is released based on rotation of the first connection member.

4. The injection molding system of claim 1, wherein the first connection member comprises at least one hole each configured to receive at least one attachment member for connecting the linking unit and the first mold.

5. The injection molding system of claim 1, wherein the first connection member comprises at least one pin for limiting movement of the first connection member in at least one direction other than a direction based on the shape of the slit.

* * * * *